United States Patent
Gao

(10) Patent No.: US 10,623,952 B2
(45) Date of Patent: Apr. 14, 2020

(54) METHOD AND APPARATUS FOR AUTHORIZING MANAGEMENT FOR EMBEDDED UNIVERSAL INTEGRATED CIRCUIT CARD

(71) Applicant: Huawei Technologies Co., Ltd., Shenzhen (CN)

(72) Inventor: Linyi Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/322,242

(22) PCT Filed: Jul. 7, 2014

(86) PCT No.: PCT/CN2014/081776
§ 371 (c)(1),
(2) Date: Dec. 27, 2016

(87) PCT Pub. No.: WO2016/004570
PCT Pub. Date: Jan. 14, 2016

(65) Prior Publication Data
US 2017/0134948 A1    May 11, 2017

(51) Int. Cl.
H04W 12/06  (2009.01)
H04W 12/04  (2009.01)
(Continued)

(52) U.S. Cl.
CPC ............ *H04W 12/06* (2013.01); *H04L 9/32* (2013.01); *H04L 63/0853* (2013.01);
(Continued)

(58) Field of Classification Search
None
See application file for complete search history.

(56) References Cited

U.S. PATENT DOCUMENTS 7,920,899 B2 *  4/2011  Jain .................. H04W 8/205
                                                           455/432.2
9,451,459 B2     9/2016  Lee et al.
(Continued)

FOREIGN PATENT DOCUMENTS

CN    1787665 A    6/2006
CN    101114933 A    1/2008
(Continued)

OTHER PUBLICATIONS

No stated author; GSMA—Remote Provisioning Architecture for Embedded UICC Technical Specification Version 1.0; 2013; GSMA; pp. 1-294, as printed (Year: 2013).*

(Continued)

*Primary Examiner* — Saleh Najjar
*Assistant Examiner* — Michael W Chao
(74) *Attorney, Agent, or Firm* — Conley Rose, P.C.

(57) ABSTRACT

A method for authorizing management for an embedded universal integrated circuit card includes: generating, by an eUICC manager, authorization information (S101); encrypting the authorization information by using eUICC management credential (S102); and sending the encrypted authorization information to an eUICC (S103), where the authorization information includes an identifier of at least one first device; or the authorization information includes at least one authorization credential. The authorization information is configured in the eUICC, and therefore, when a subsequently authorized first device manages a profile in the eUICC, the eUICC may directly accept or reject, according to a stored correspondence between a profile management function and an authorized first device, to be managed, without obtaining authorization information each time.

23 Claims, 8 Drawing Sheets

(51) Int. Cl.
*H04W 4/70* (2018.01)
*H04L 29/06* (2006.01)
*H04L 9/32* (2006.01)
*H04W 8/18* (2009.01)
*H04W 12/00* (2009.01)

(52) U.S. Cl.
CPC ............ *H04W 4/70* (2018.02); *H04W 8/183* (2013.01); *H04W 12/0023* (2019.01); *H04W 12/04* (2013.01); *H04L 2209/80* (2013.01)

(56) References Cited

U.S. PATENT DOCUMENTS

| | | | |
|---|---|---|---|
| 9,462,457 | B2 | 10/2016 | Gao et al. |
| 9,674,690 | B2* | 6/2017 | Lee ............ H04W 8/183 |
| 10,033,422 | B2 | 7/2018 | Wang et al. |
| 10,091,653 | B2* | 10/2018 | Lee ............ H04W 12/06 |
| 10,284,550 | B2* | 5/2019 | Suh ............ H04L 63/0428 |
| 10,292,042 | B2* | 5/2019 | Christopher ........ H04W 76/10 |
| 10,387,134 | B2 | 8/2019 | Gao |
| 10,410,191 | B2* | 9/2019 | Ceribelli ............ G06Q 20/0425 |
| 10,462,668 | B2* | 10/2019 | Lee ............ H04L 63/0853 |
| 10,476,859 | B2* | 11/2019 | Chastain ............ H04W 4/50 |
| 2006/0085848 | A1 | 4/2006 | Aissi et al. |
| 2008/0114570 | A1 | 5/2008 | Li et al. |
| 2009/0036126 | A1 | 2/2009 | Morikuni et al. |
| 2009/0111467 | A1 | 4/2009 | Chai et al. |
| 2010/0279674 | A1 | 11/2010 | Zou et al. |
| 2011/0191252 | A1 | 8/2011 | Dai |
| 2012/0115440 | A1 | 5/2012 | Naito et al. |
| 2012/0117635 | A1 | 5/2012 | Schell et al. |
| 2012/0178418 | A1 | 7/2012 | Yu |
| 2012/0190354 | A1 | 7/2012 | Merrien et al. |
| 2013/0012168 | A1 | 1/2013 | Rajadurai et al. |
| 2013/0026232 | A1 | 1/2013 | Zhou et al. |
| 2013/0122864 | A1* | 5/2013 | Haggerty ............ H04L 63/105 455/411 |
| 2013/0157673 | A1* | 6/2013 | Brusilovsky ............ H04W 4/70 455/450 |
| 2013/0212637 | A1 | 8/2013 | Guccione et al. |
| 2013/0231087 | A1* | 9/2013 | O'Leary ............ H04W 8/22 455/411 |
| 2013/0281077 | A1 | 10/2013 | Zou et al. |
| 2013/0339305 | A1 | 12/2013 | Kim et al. |
| 2013/0344864 | A1* | 12/2013 | Park ............ H04W 8/18 455/432.3 |
| 2014/0004827 | A1* | 1/2014 | O'Leary ............ H04W 8/22 455/411 |
| 2014/0011541 | A1 | 1/2014 | Cormier et al. |
| 2014/0012755 | A1 | 1/2014 | Walker et al. |
| 2014/0140507 | A1* | 5/2014 | Park ............ H04W 8/245 380/247 |
| 2014/0141746 | A1 | 5/2014 | Tan et al. |
| 2014/0183258 | A1* | 7/2014 | DiMuro ............ G06Q 20/4012 235/380 |
| 2014/0219447 | A1 | 8/2014 | Park et al. |
| 2014/0235210 | A1* | 8/2014 | Park ............ H04W 12/04 455/411 |
| 2014/0237101 | A1* | 8/2014 | Park ............ H04L 67/303 709/223 |
| 2014/0287725 | A1 | 9/2014 | Lee |
| 2014/0329502 | A1 | 11/2014 | Lee et al. |
| 2015/0011202 | A1 | 1/2015 | Guo et al. |
| 2015/0087269 | A1 | 3/2015 | Lee et al. |
| 2015/0110035 | A1* | 4/2015 | Lee ............ H04W 8/183 370/329 |
| 2015/0111573 | A1 | 4/2015 | Barton et al. |
| 2015/0121495 | A1 | 4/2015 | Gao et al. |
| 2015/0208239 | A1 | 7/2015 | Bai et al. |
| 2015/0281198 | A1* | 10/2015 | Lee ............ H04W 8/18 726/7 |
| 2015/0281964 | A1* | 10/2015 | Seo ............ H04L 63/102 726/9 |
| 2016/0080932 | A1* | 3/2016 | Jin ............ H04W 8/183 455/418 |
| 2016/0149903 | A1 | 5/2016 | Suh |
| 2016/0295399 | A1* | 10/2016 | Li ............ H04W 8/06 |
| 2016/0337861 | A1 | 11/2016 | Hawkes et al. |
| 2017/0289792 | A1 | 10/2017 | Park |
| 2019/0026092 | A1 | 1/2019 | Gao |
| 2019/0294426 | A1 | 9/2019 | Gao |

FOREIGN PATENT DOCUMENTS

| | | |
|---|---|---|
| CN | 101119387 A | 2/2008 |
| CN | 101146346 A | 3/2008 |
| CN | 101159615 A | 4/2008 |
| CN | 101453714 A | 6/2009 |
| CN | 101471871 A | 7/2009 |
| CN | 102026149 A | 4/2011 |
| CN | 102184110 A | 9/2011 |
| CN | 102314408 A | 1/2012 |
| CN | 102497630 A | 6/2012 |
| CN | 102630081 A | 8/2012 |
| CN | 102685727 A | 9/2012 |
| CN | 102883300 A | 1/2013 |
| CN | 102917338 A | 2/2013 |
| CN | 101895844 B | 6/2013 |
| CN | 103370915 A | 10/2013 |
| CN | 103686587 A | 3/2014 |
| CN | 103731823 A | 4/2014 |
| CN | 103747104 A | 4/2014 |
| CN | 103782568 A | 5/2014 |
| EP | 2222024 A1 | 8/2010 |
| EP | 2461613 A1 | 6/2012 |
| EP | 2575292 A | 4/2013 |
| EP | 2854432 A2 | 4/2015 |
| EP | 2858393 A1 | 4/2015 |
| FR | 2994048 A1 | 1/2014 |
| KR | 20130026351 A | 3/2013 |
| KR | 20130026958 A | 3/2013 |
| KR | 20130027096 A | 3/2013 |
| KR | 20130049726 A | 5/2013 |
| WO | 2012076464 A1 | 6/2012 |
| WO | 2012085593 A1 | 6/2012 |
| WO | 2013027085 A1 | 2/2013 |
| WO | 2013036009 A1 | 3/2013 |
| WO | 2013036010 A1 | 3/2013 |
| WO | 2013048084 A2 | 4/2013 |
| WO | 2013123233 A2 | 8/2013 |
| WO | 2013176499 A2 | 11/2013 |
| WO | 2014059913 A1 | 4/2014 |

OTHER PUBLICATIONS

Zhimin, D., et al., "Embedded UICC and its Remote Management Technology," Apr. 2012, pp. 48-51.
"GSMA's Embedded SIM Remote Provisioning Architecture Document," 12ESIM22_04r3, May 28, 2013, 2 pages.
"Embedded SIM Task Force Requirements and Use Cases," GSM Association, 1.0, Feb. 21, 2011, 38 pages.
"Reprogrammable SIMs: Technology, Evolution and Implications," Final Report, CSMG, A TMNG Global Company, Sep. 25, 2012, 95 pages.
"LS on GSMA's Embedded SIM Remote Provisioning Architecture Document," ETSI IC SCP REQ Meeting #44, SCPREQ(13)000077, Jul. 8-10, 2013, 1 page.
"EUICC Security Framework," ETSI SCPTEC#47, SCPTEC(13)000037, Apple, 12 pages.
"EUICC Architecture," SCPTEC(13)000130r6, ETSI TC SCP TEC Meeting #52, Jun. 2-6, 2014, 4 pages.
"EUICC Manager," SCPTEC(14)000075, Apple Inc, May 25, 2014, 4 pages.
"Smart Cards; Embedded UICC; Requirements Specification (Release 12)," ETSI TS103 383, V12.4.0, Apr. 2014, 22 pages.
"Reprogrammable SIMs: Technology, Evolution and Implications," Final Report, CSMG, XP002716258, Sep. 25, 2012, 96 pages.
"A High Level Remote Provisioning Architecture," XP014099004, Embedded UICC, Jul. 18-20, 2011, 16 pages.

(56) References Cited

OTHER PUBLICATIONS

"<Smart Cards; Embedded UICC; Requirements Specification>," XP014099322, Draft ETSI TS 103 383, V<0.0.6>, Technical Specification, May 2011, 20 pages.
"Embedded SIM Task Force Requirements and Use Cases," XP062097169, 1.0, Feb. 21, 2011, 38 pages.
"Smart Cards; Embedded UICC; Technical Specification (Release 12)," ETSI TS 103 384, V0.6.0, Mar. 2014, 14 pages.
Machine Translation and Abstract of Chinese Publication No. CN1787665, dated Jun. 14, 2006, 7 pages.
Machine Translation and Abstract of Chinese Publication No. CN101895844, dated Jun. 5, 2013, 4 pages.
Machine Translation and Abstract of Chinese Publication No. CN101159615, dated Apr. 9, 2008, 4 pages.
Foreign Communication From A Counterpart Application, Chinese Application No. 201210390400.9, Chinese Office Action dated May 4, 2016, 6 pages.
Foreign Communication From A Counterpart Application, PCT Application No. PCT/CN2013/086644, English Translation of International Search Report dated Jan. 23, 2014, 4 pages.
Foreign Communication From A Counterpart Application, PCT Application No. PCT/CN2013/086644, English Translation of Written Opinion dated Jan. 23, 2014, 17 pages.
Foreign Communication From A Counterpart Application, PCT Application No. PCT/CN2013/085222, English Translation of International Search Report dated Jan. 16, 2014, 3 pages.
Foreign Communication From A Counterpart Application, PCT Application No. PCT/CN2013/085222, English Translation of Written Opinion dated Jan. 16, 2014, 9 pages.
Foreign Communication From A Counterpart Application, PCT Application No. PCT/CN2014/093106, English Translation of International Search Report dated Mar. 6, 2015, 2 pages.
Foreign Communication From A Counterpart Application, PCT Application No. PCT/CN2014/093106, English Translation of Written Opinion dated Mar. 6, 2015, 6 pages.
Foreign Communication From A Counterpart Application, PCT Application No. PCT/CN2014/081776, English Translation of International Search Report dated Mar. 27, 2015, 2 pages.
Foreign Communication From A Counterpart Application, PCT Application No. PCT/CN2014/081776, English Translation of Written Opinion dated Mar. 27, 2015, 8 pages.
Foreign Communication From A Counterpart Application, European Application No. 14892527.4, Extended European Search Report dated Apr. 6, 2017, 9 pages.
Foreign Communication From A Counterpart Application, European Application No. 14897155.9, Extended European Search Report dated May 9, 2017, 9 pages.
Foreign Communication From A Counterpart Application, European Application No. 14867716.4, Extended European Search Report dated Sep. 28, 2016, 12 pages.
Foreign Communication From A Counterpart Application, European Application No. 13847443.2, Extended European Search Report dated Oct. 2, 2015, 4 pages.
Foreign Communication From A Counterpart Application, European Application No. 13852843.5, Extended European Search Report dated Oct. 28, 2015, 10 pages.
"Remote Provisioning Architecture for Embedded UICC," GSM Association, Version 1.43, Jul. 1, 2013, 82 pages.
Notice of Allowance dated Mar. 21, 2018, 10 pages, U.S. Appl. No. 15/358,506, filed Nov. 22, 2016.
Foreign Communication From A Counterpart Application, PCT Application No. PCT/CN2014/078257, English Translation of International Search Report dated Feb. 26, 2015, 2 pages.
Foreign Communication From A Counterpart Application, PCT Application No. PCT/CN2014/078257, English Translation of Written Opinion dated Feb. 26, 2015, 10 pages.
Machine Translation and Abstract of International Publication No. WO2013036009, dated Mar. 14, 2013, 27 pages.
Foreign Communication From A Counterpart Application, Chinese Application No. 201480077513.0, Chinese Office Action dated Mar. 29, 2019, 55 pages.
Machine Translation and Abstract of Korean Publication No. KR20130027096, Mar. 15, 2013, 22 pages.
Huawei, "Continuation of Comparison between possible H(e)NB authentication credentials," 3GPP TSG SA WG3 Security — S3#52, Sophia Antipolis, France, Jun. 23-27, 2008, S3-080707, 10 pages.
Gonaboina, S., et al., "Secure QR-Pay System with Ciphering Techniques in Mobile Devices," International Journal of Electronics and Computer Science Engineering, pp. 1905-1912.
English Translation of the Written Opinion of the International Searching Authority, dated Mar. 27, 2015, in International Application No. PCT/CN2014/081776, 8 pages.
Foreign Communication From a Counterpart Application, Korean Application No. 10-2019-7012388, Korean Office Action dated Jul. 24, 2019, 5 pages.
Foreign Communication From a Counterpart Application, Korean Application No. 10-2019-7012388, English Translation of Korean Office Action dated Jul. 24, 2019, 3 pages.

\* cited by examiner

METHOD AND APPARATUS FOR AUTHORIZING MANAGEMENT FOR EMBEDDED UNIVERSAL INTEGRATED CIRCUIT CARD

CROSS-REFERENCE TO RELATED APPLICATIONS

This application is a national stage application of international patent application number PCT/CN2014/081776 filed on Jul. 7, 2014, which is incorporated by reference.

TECHNICAL FIELD

The present disclosure relates to communications technologies, and in particular, to a method and an apparatus for authorizing management for an embedded universal integrated circuit card.

BACKGROUND

An embedded universal integrated circuit card (eUICC) is a traditional universal integrated circuit card (UICC) embedded in a terminal, but is not removable, and therefore cannot be arbitrarily replaced like a traditional UICC card. However, a profile in the eUICC card can be changed through remote management. The profile is a combination of a file structure, an application, data, and the like, and after the profile is configured in the eUICC, the eUICC may access a mobile network by using the profile. Specifically, a profile manager (PM) outside the eUICC card may manage all profile management functions of each profile in the eUICC card by using a corresponding management function in the eUICC card, such as a profile management domain (PMD). The profile management functions may include: transmission, activation, deactivation, deletion, and the like. However, if the PM is used to manage the profile in the eUICC card, the PM needs to be authorized.

In some approaches, authorization information is stored in an authorization server, and each time after a communications device is started, the communications device needs to report a device serial number to the authorization server, to obtain the authorization information from the authorization server. However, efficiency of the authorization manner is low.

SUMMARY

Embodiments of the present disclosure provide a method and an apparatus for authorizing management for an embedded universal integrated circuit card, so as to resolve an inefficient authorization manner problem in some approaches.

In the embodiments of the present disclosure, an initiator may be a mobile network operator (MNO) or a service provider (SP), and a first device may be a PM or a profile provisioner (PP).

A first aspect of the embodiments of the present disclosure provides a method for authorizing management for an embedded universal integrated circuit card, including: generating, by an embedded universal integrated circuit card eUICC manager, authorization information; encrypting, by the eUICC manager, the authorization information by using eUICC management credential; and sending, by the eUICC manager, the encrypted authorization information to an eUICC, where the authorization information includes an identifier of at least one first device; or the authorization information includes at least one authorization credential.

With reference to the first aspect, in a first possible implementation manner of the first aspect, when the authorization information includes the identifier of the at least one first device, the authorization information further includes a granted profile management function corresponding to each first device in the at least one first device.

With reference to the first aspect, in a second possible implementation manner of the first aspect, the authorization information further includes a switching identifier, and the switching identifier is used to instruct to grant, to a first device b in the at least one first device, all of profile management functions currently granted to a first device a in the at least one first device.

With reference to the first aspect, in a third possible implementation manner of the first aspect, when the authorization information includes the at least one authorization credential, the method further includes: sending, by the eUICC manager, each authorization credential in the at least one authorization credential to a corresponding first device in the at least one first device.

With reference to the first aspect, in a fourth possible implementation manner of the first aspect, when the authorization information includes the at least one authorization credential, the authorization information further includes a granted profile management function corresponding to each authorization credential in the at least one authorization credential.

With reference to the fourth possible implementation manner of the first aspect, in a fifth possible implementation manner of the first aspect, when the authorization information includes an authorization credential corresponding to a first device a in the at least one first device and a profile management function granted to the first device a, the method further includes: sending, by the eUICC manager to the first device a, the authorization credential corresponding to the first device a in the authorization information and the profile management function granted to the first device a in the authorization information.

With reference to any one of the first aspect to the fifth possible implementation manner of the first aspect, in a sixth possible implementation manner of the first aspect, the authorization information further includes an identifier of a profile that is in the eUICC and that is granted to the at least one first device for management.

With reference to the first aspect, in a seventh possible implementation manner of the first aspect, the sending, by the eUICC manager, the encrypted authorization information to an eUICC includes: sending, by the eUICC manager, the encrypted authorization information to a first device a in the at least one first device, and sending, by the first device a, the encrypted authorization information to the eUICC; or sending, by the eUICC manager, the encrypted authorization information to a first device a in the at least one first device; sending, by the first device a, the encrypted authorization information to a second device; and sending, by the second device, the encrypted authorization information to the eUICC.

A second aspect of the embodiments of the present disclosure provides a method for authorizing management for an embedded universal integrated circuit card, including: receiving, by an embedded universal integrated circuit card eUICC, encrypted authorization information sent by an eUICC manager or one of at least one first device; and decrypting, by the eUICC, the encrypted authorization information, to obtain authorization information; and when the authorization information includes an identifier of the at least one first device, updating, by the eUICC according to the authorization information, an identifier of a first device corresponding to each profile management function in the eUICC; or when the authorization information includes at least one authorization credential, updating, by the eUICC according to the authorization information, an authorization credential corresponding to each profile management function in the eUICC.

With reference to the second aspect, in a first possible implementation manner of the second aspect, when the authorization information includes the identifier of the at least one first device, the authorization information further includes a granted profile management function corresponding to each first device in the at least one first device.

With reference to the second aspect, in a second possible implementation manner of the second aspect, the authorization information further includes a switching identifier, and the switching identifier is used to instruct to grant, to a first device b in the at least one first device, all of profile management functions currently granted to a first device a in the at least one first device.

With reference to the second aspect, in a third possible implementation manner of the second aspect, when the authorization information includes the at least one authorization credential, the authorization information further includes a granted profile management function corresponding to each authorization credential in the at least one authorization credential.

With reference to any one of the second aspect to the third possible implementation manner of the second aspect, in a fourth possible implementation manner of the second aspect, the authorization information further includes an identifier of a profile that is in the eUICC and that is granted to the at least one first device for management.

A third aspect of the embodiments of the present disclosure provides an apparatus for authorizing management for an embedded universal integrated circuit card, including: a generation module configured to: generate authorization information, and send the authorization information to an encryption module; the encryption module configured to: encrypt the authorization information by using eUICC management credential, and send the encrypted authorization information to a sending module; and the sending module configured to send the encrypted authorization information to an eUICC, where the authorization information includes an identifier of at least one first device; or the authorization information includes at least one authorization credential.

With reference to the third aspect, in a first possible implementation manner of the third aspect, when the authorization information includes the identifier of the at least one first device, the authorization information further includes a granted profile management function corresponding to each first device in the at least one first device.

With reference to the third aspect, in a second possible implementation manner of the third aspect, the authorization information further includes a switching identifier, and the switching identifier is used to instruct to grant, to a first device b in the at least one first device, all of profile management functions currently granted to a first device a in the at least one first device.

With reference to the third aspect, in a third possible implementation manner of the third aspect, the sending module is further configured to: when the authorization information includes the at least one authorization credential, send each authorization credential in the at least one authorization credential to a corresponding first device in the at least one first device.

With reference to the third aspect, in a fourth possible implementation manner of the third aspect, when the authorization information includes the at least one authorization credential, the authorization information further includes a granted profile management function corresponding to each authorization credential in the at least one authorization credential.

With reference to the fourth possible implementation manner of the third aspect, in a fifth possible implementation manner of the third aspect, the sending module is further configured to: when the authorization information includes an authorization credential corresponding to a first device a in the at least one first device and a profile management function granted to the first device a, send, to the first device a, the authorization credential corresponding to the first device a in the authorization information and the profile management function granted to the first device a in the authorization information.

With reference to any one of the third aspect to the fifth possible implementation manner of the third aspect, in a sixth possible implementation manner of the third aspect, the authorization information further includes an identifier of a profile that is in the eUICC and that is granted to the at least one first device for management.

With reference to the third aspect, in a sixth possible implementation manner of the third aspect, the sending module is specifically configured to: send the encrypted authorization information to a first device a in the at least one first device, where the encrypted authorization information is sent to the eUICC by the first device a; or send the encrypted authorization information to a first device a in the at least one first device, where the encrypted authorization information is sent to a second device by the first device a, and is then sent to the eUICC by the second device.

A fourth aspect of the embodiments of the present disclosure provides an apparatus for authorizing management for an embedded universal integrated circuit card, including: a receiving module configured to: receive encrypted authorization information sent by an eUICC manager or one of at least one first device, and send the encrypted authorization information to a decryption module; the decryption module configured to: decrypt the encrypted authorization information to obtain authorization information, and send the authorization information to an updating module; and the updating module configured to: when the authorization information includes an identifier of the at least one first device, update, according to the authorization information, an identifier of a first device corresponding to each profile management function in an eUICC; or when the authorization information includes at least one authorization credential, update, according to the authorization information, an authorization credential corresponding to each profile management function in the eUICC.

With reference to the fourth aspect, in a first possible implementation manner of the fourth aspect, when the authorization information includes the identifier of the at least one first device, the authorization information further includes a granted profile management function corresponding to each first device in the at least one first device.

With reference to the fourth aspect, in a second possible implementation manner of the fourth aspect, the authorization information further includes a switching identifier, and the switching identifier is used to instruct to grant, to a first device b in the at least one first device, all of profile management functions currently granted to a first device a in the at least one first device.

With reference to the fourth aspect, in a third possible implementation manner of the fourth aspect, when the authorization information includes the at least one authorization credential, the authorization information further includes a granted profile management function corresponding to each authorization credential in the at least one authorization credential.

With reference to any one of the fourth aspect to the third possible implementation manner of the fourth aspect, in a fourth possible implementation manner of the fourth aspect, the authorization information further includes an identifier of a profile that is in the eUICC and that is granted to the at least one first device for management.

A fifth aspect of the present disclosure provides an apparatus for authorizing management for an embedded universal integrated circuit card, including: a processor configured to: generate authorization information, and encrypt the authorization information by using eUICC management credential; and a sender configured to send the encrypted authorization information to an eUICC, where the authorization information includes an identifier of at least one first device; or the authorization information includes at least one authorization credential.

With reference to the fifth aspect, in a first possible implementation manner of the fifth aspect, when the authorization information includes the identifier of the at least one first device, the authorization information further includes a granted profile management function corresponding to each first device in the at least one first device.

With reference to the fifth aspect, in a second possible implementation manner of the fifth aspect, the authorization information further includes a switching identifier, and the switching identifier is used to instruct to grant, to a first device b in the at least one first device, all of profile management functions currently granted to a first device a in the at least one first device.

With reference to the fifth aspect, in a third possible implementation manner of the fifth aspect, the sender is configured to: when the authorization information includes the at least one authorization credential, send each authorization credential in the at least one authorization credential to a corresponding first device in the at least one first device.

With reference to the fifth aspect, in a fourth possible implementation manner of the fifth aspect, when the authorization information includes the at least one authorization credential, the authorization information further includes a granted profile management function corresponding to each authorization credential in the at least one authorization credential.

With reference to the fourth possible implementation manner of the fifth aspect, in a fifth possible implementation manner of the fifth aspect, the sender is configured to: when the authorization information includes an authorization credential corresponding to a first device a in the at least one first device and a profile management function granted to the first device a, send, to the first device a, the authorization credential corresponding to the first device a in the authorization information and the profile management function granted to the first device a in the authorization information.

With reference to any one of the fifth aspect to the fifth possible implementation manner of the fifth aspect, in a sixth possible implementation manner of the fifth aspect, the authorization information further includes an identifier of a profile that is in the eUICC and that is granted to the at least one first device for management.

With reference to the fifth aspect, in a seventh possible implementation manner of the fifth aspect, the sender is specifically configured to: send the encrypted authorization information to a first device a in the at least one first device, where the encrypted authorization information is sent to the eUICC by the first device a; or, send the encrypted authorization information to a first device a in the at least one first device, where the encrypted authorization information is sent to a second device by the first device a, and is then sent to the eUICC by the second device.

A sixth aspect of the embodiments of the present disclosure provides an apparatus for authorizing management for an embedded universal integrated circuit card, including: a receiver configured to receive encrypted authorization information sent by an eUICC manager or one of at least one first device; and a processor configured to: decrypt the encrypted authorization information to obtain authorization information; and when the authorization information includes an identifier of the at least one first device, update, according to the authorization information, an identifier of a first device corresponding to each profile management function in an eUICC; or when the authorization information includes at least one authorization credential, update, according to the authorization information, an authorization credential corresponding to each profile management function in an eUICC.

With reference to the sixth aspect, in a first possible implementation manner of the sixth aspect, when the authorization information includes the identifier of the at least one first device, the authorization information further includes a granted profile management function corresponding to each first device in the at least one first device.

With reference to the sixth aspect, in a second possible implementation manner of the sixth aspect, the authorization information further includes a switching identifier, and the switching identifier is used to instruct to grant, to a first device b in the at least one first device, all of profile management functions currently granted to a first device a in the at least one first device.

With reference to the sixth aspect, in a third possible implementation manner of the sixth aspect, when the authorization information includes the at least one authorization credential, the authorization information further includes a granted profile management function corresponding to each authorization credential in the at least one authorization credential.

With reference to any one of the sixth aspect to the third possible implementation manner of the sixth aspect, in a fourth possible implementation manner of the sixth aspect, the authorization information further includes an identifier of a profile that is in the eUICC and that is granted to the at least one first device for management.

In the embodiments of the present disclosure, an eUICC manager generates authorization information, and sends the encrypted authorization information to an eUICC after encrypting the authorization information. In this way, after receiving the authorization information, the eUICC may update an identifier of a first device corresponding to a profile management function in the eUICC, and the updated correspondences between profile management functions and authorized first devices are stored in the eUICC, thereby configuring the authorization information in the eUICC. When a subsequently authorized first device manages a profile in the eUICC, the eUICC may directly accept or reject, according to the a stored correspondence between a profile management function and an authorized first device, to be managed, without obtaining the authorization information each time.

BRIEF DESCRIPTION OF DRAWINGS

To describe the technical solutions in the embodiments of the present disclosure, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For a profile that needs to be managed in an eUICC, the embodiments of the present disclosure provide a method and an apparatus for authorizing a device that manages the profile, so as to configure authorization information in the eUICC.

Figure 1:
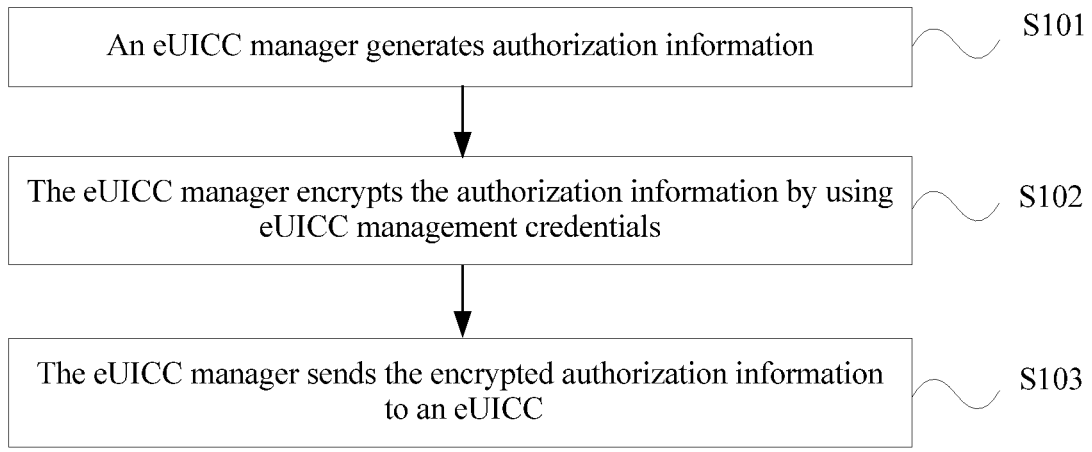
FIG. 1 is a schematic flowchart of Embodiment 1 of a method for authorizing management for an embedded universal integrated circuit card according to the present disclosure.

FIG. 1 is a schematic flowchart of Embodiment 1 of a method for authorizing management for an embedded universal integrated circuit card according to the present disclosure. In this embodiment, an initiator may be an MNO or an SP, and a first device may be a PM or a PP. The PM has functions of managing a profile in an eUICC, such as transmission, activation, and deactivation. The PP has a function of generating a profile, and downloads the generated profile to an eUICC by means of the PM. Before the following method is performed, the initiator signs contracts with both an eUICC manager and at least one first device, to establish service relationships. As shown in FIG. 1, the method includes:

S101. The eUICC manager generates authorization information.

The eUICC Manager may be a logical unit or a physical entity. The eUICC Manager may authorize management for the eUICC.

S102. The eUICC manager encrypts the authorization information by using eUICC management credential. The eUICC management credential may be a pre-stored symmetric key or a temporarily generated symmetric key.

Alternatively, the eUICC manager may encrypt the authorization information by using a public key of the eUICC.

S103. The eUICC manager sends the encrypted authorization information to the eUICC.

Specifically, (1) the authorization information may include an identifier of the at least one first device. An identifier of a first device may be a name of the first device or an identity (ID) of the first device. Alternatively, (2) the authorization information includes at least one authorization credential.

If the authorization information includes at least one authorization credential, when a device manages the eUICC, provided that the device carries any one of the at least one authorization credential, it is indicated that all of profile management functions are granted to the device. However, generally, the eUICC allocates a corresponding authorization credential to each first device.

If the authorization information includes the identifier of the at least one first device, it is indicated that all of the profile management functions are granted to the at least one first device, that is, each of the at least one first device can execute all the profile management functions on the eUICC.

For example, when the first device is a PM, the profile management functions may include: profile transmission, profile activation, profile deactivation, profile deletion, and the like. When the first device is a PP, the profile management functions may include profile download and the like.

In this embodiment, an eUICC manager generates authorization information, and sends the encrypted authorization information to an eUICC after encrypting the authorization information. In this way, after receiving the authorization information, the eUICC may update an identifier of a first device corresponding to a profile management function in the eUICC, and the updated correspondences between profile management functions and authorized first devices are stored in the eUICC, thereby configuring the authorization information in the eUICC. When a subsequently authorized first device manages a profile in the eUICC, the eUICC may directly accept or reject, according to the a stored correspondence between a profile management function and an authorized first device, to be managed, without obtaining the authorization information each time.

Further, in a case in which the authorization information includes only the identifier of the at least one first device, if only some of the profile management functions are granted to each first device in the at least one first device, the authorization information may further include: a granted profile management function corresponding to each first device in the at least one first device.

The authorization information may be represented in a form of an authorization list. It is assumed that three first devices are to manage the eUICC, and identifiers of the three first devices are respectively marked as first device a, first device b, and first device c, as shown in Table 1.

TABLE 1

| Profile activation | First device a |
|---|---|
| Profile deactivation | First device a and first device b |
| Profile deletion | First device c |

It is indicated that a profile activation function is granted to a first device a, a profile deactivation function is granted to the first device a and a first device b, and a profile deletion function is granted to a first device c. After receiving the authorization information, the eUICC updates, according to the authorization information, an identifier of a first device corresponding to a profile management function in the eUICC. Specifically, the eUICC may also store the authorization information in a form of Table 1.

On a basis of the foregoing embodiment, when the authorization information includes the identifier of the at least one first device, the authorization information may further includes a switching identifier, and the switching identifier is used to instruct to grant, to the first device b in the at least one first device, all of profile management functions currently granted to the first device a in the at least one first device. In this case, the authorization information includes: the identifier of the first device a, the identifier of the first device b, and the switching identifier. When updating the authorization information after receiving the authorization information, the eUICC replaces the original identifier of the first device a corresponding to the profile management functions with the identifier of the first device b. It is assumed that the profile management functions currently granted to the first device a include profile activation and profile deactivation, and the switching identifier is used to instruct to grant both the "profile activation" and "profile deactivation" management functions to the first device b. After authorization succeeds, the first device b may execute "profile activation" and "profile deactivation" on the profile in the eUICC, and the first device a can no longer execute "profile activation" or "profile deactivation" on the profile in the eUICC. After receiving the authorization information, the eUICC replaces the original identifier of the first device a corresponding to the "profile activation" and "profile deactivation" management functions with the identifier of the first device b.

In another embodiment, when the authorization information includes at least one authorization credential, the eUICC manager further sends each authorization credential in the at least one authorization credential to a corresponding first device in the at least one first device. It is assumed that there are three authorization credentials "001", "002", and "003", the "001" is corresponding to a first device a, the "002" is corresponding to a first device b, and the "003" is corresponding to a first device c. The eUICC manager sends the "001" to the first device a, sends the "002" to the first device b, and sends the "003" to the first device c.

Further, when the authorization information includes at least one authorization credential, if only some of the profile management functions are granted to each first device in the at least one first device, the authorization information may further include a granted profile management function corresponding to each authorization credential in the at least one authorization credential. In this case, the authorization information further needs to be sent to the corresponding first device in the at least one first device.

Figure 2:
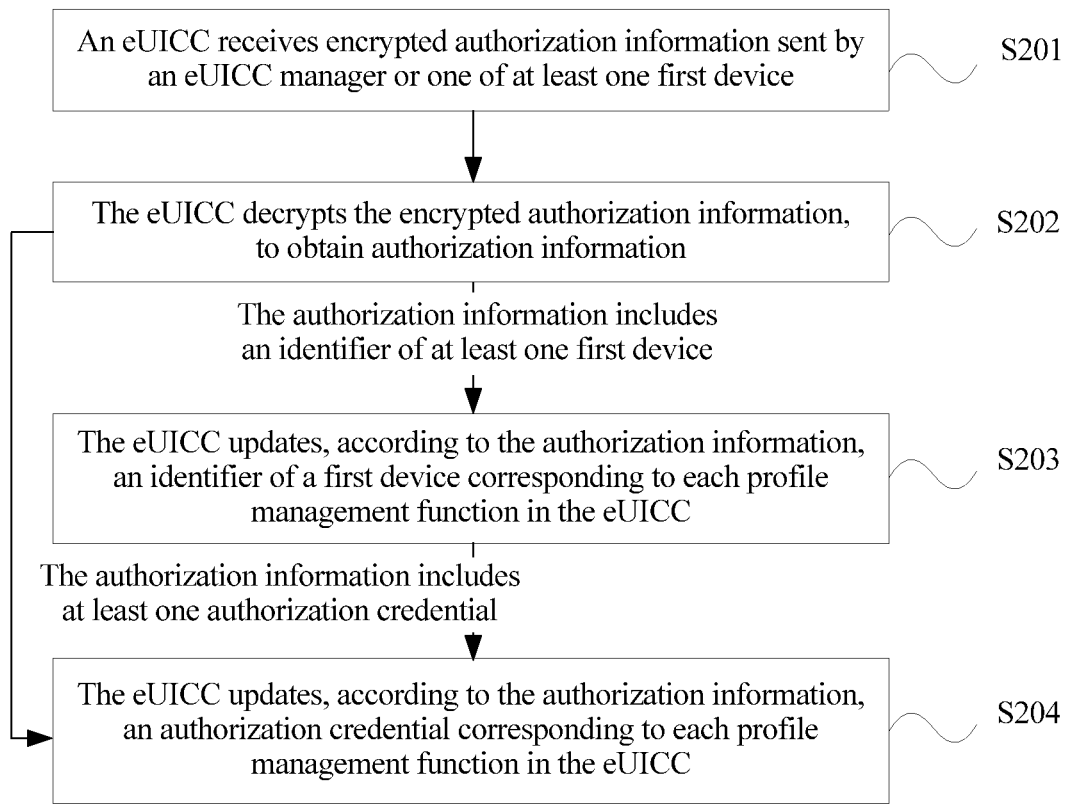
FIG. 2 is a schematic flowchart of Embodiment 2 of a method for authorizing management for an embedded universal integrated circuit card according to the present disclosure.

The authorization information may also be represented in a form of an authorization list, as shown in FIG. 2:

TABLE 2

| Profile activation | 001 |
|---|---|
| Profile deactivation | 002 |
| Profile deletion | 003 |

The "001" is an authorization credential corresponding to a "profile activation" function, the "002" is an authorization credential corresponding to a "profile deactivation" function, and the "003" is an authorization credential corresponding to a "profile deletion" function.

In a case in which the authorization information includes only the authorization credential, if the authorization information includes a switching identifier, the authorization information further needs to include a profile management function granted to a first device. For example, the authorization information includes the switching identifier, to instruct to grant, to the first device b in the at least one first device, all of profile management functions currently granted to the first device a in the at least one first device. After receiving the authorization information, the eUICC updates the original authorization credential corresponding to the first device a to the authorization credential corresponding to the first device b. In this case, the authorization information includes the authorization credential corresponding to the first device a, the authorization credential corresponding to the first device b, and the switching identifier.

When the first device a needs to execute a first profile management function on the eUICC, a first authorization credential is carried, and the eUICC searches authorization credentials that are corresponding to the first profile management function and in the eUICC. If an authorization credential identical to the first authorization credential is found, the eUICC allows the first device a to execute the first profile management function.

It is assumed that the first device a needs to perform a "profile activation" operation on the eUICC. The first device a needs to carry the authorization credential "001", and the eUICC searches authorization credentials corresponding to "profile activation". If the "001" is found, the eUICC allows the first device to perform the "profile activation" operation on the eUICC.

Specifically, in some cases, authorization information further needs to be sent to the first device. For example: (1) when each profile management function is corresponding to a different authorization credential, if a new profile management function needs to be additionally granted to the first device a, authorization information needs to be sent to the corresponding first device a; (2) the first device a has not managed the eUICC before, and authorization information needs to be sent to the corresponding first device a. In this case, the authorization information sent to the first device a may be different from the authorization information sent to the eUICC.

Specifically, when the authorization information may include the authorization credential corresponding to the first device a in the at least one first device and the authorization functions granted to the first device a, the eUICC manager sends, to the first device a, the authorization credential corresponding to the first device a in the authorization information and the profile management functions granted to the first device a in the authorization information. For example, authorization information sent by the eUICC manager to the eUICC includes the authorization credential corresponding to the first device a, and also includes the authorization credential corresponding to the first device b. When authorization information is sent to the first device a, the authorization information includes only the authorization credential corresponding to the first device a and the profile management functions granted to the first device a.

On a basis of the foregoing embodiment, if the authorization information is only for a case in which some of profiles in the eUICC need to be managed, the authorization information may further include an identifier of a profile that is in the eUICC and that is granted to the at least one first device for management. If the authorization information is for all of profiles in the eUICC, identifiers of the profiles in the eUICC do not need to be carried.

Further, the eUICC manager sends the encrypted authorization information to the eUICC. In addition to that the eUICC manager directly sends the encrypted authorization information to the eUICC, when the first device is a PM, the eUICC manager may send the encrypted authorization information to the first device a in the at least one first device, and the encrypted authorization information is sent to the eUICC by the first device a. The first device a is any one of the at least one first device a.

When the first device is a PP, the eUICC manager sends the encrypted authorization information to the first device a in the at least one first device, and the encrypted authorization information is sent to a second device by the first device a, and is then sent to the eUICC by the second device. The second device is a PM, and may help the PP by forwarding the authorization information to the eUICC.

It should be noted that, when forwarding the encrypted authorization information, the first device or the second device may perform secondary encryption on the encrypted authorization information. The eUICC manager encrypts the authorization information by using the management credential, to ensure that only the eUICC can perform decryption, and prevent the first device from modifying content in the authorization information.

In a specific implementation process, before the eUICC manager generates the authorization information, the eUICC manager further needs to receive a request message. Specifically, there may be the following cases: (1) The eUICC manager receives a request message sent by the initiator or a first device in the at least one first device. Alternatively, (2) the eUICC manager receives request messages separately sent by multiple first devices in the at least one first device.

More specifically, when some of the profile management functions currently granted to the first device a in the at least one first device need to be granted to the first device b in the at least one first device, or neither the first device a nor the first device b has managed the eUICC, the request message includes: an identifier of the eUICC, the identifier of the first device a, the profile management functions granted to the first device a, the identifier of the first device b, and the profile management function granted to the first device b. In this way, after receiving the request message, the eUICC manager learns which profile management functions are granted to the first device a and which profile management functions are granted to the first device b, and further generates the authorization information. An operation method for a case in which multiple first devices are included is similar, and details are not described herein.

If all or some of the profile management functions need to be granted to the first device a in the at least one first device, the request message includes: the identifier of the eUICC, the identifier of the first device a, and the profile management functions granted to the first device a. When all of the profile management functions need to be granted to the first device a in the at least one first device, the request message may include only the identifier of the eUICC and the identifier of the first device a. The first device a may be any one of the at least one first device.

If all of the profile management functions granted to the first device a in the at least one first device need to be granted to the first device b in the at least one first device, the request message includes: the identifier of the eUICC, the identifier of the first device a, the identifier of the first device b, and a switching identifier, and the switching identifier is used to instruct to grant, to the first device b, all of the profile management functions currently granted to the first device a. Alternatively, the request message is a switching request, and the switching request includes: the identifier of the eUICC, the identifier of the first device a, and the identifier of the first device b. In this case, the switching request can instruct to grant, to the first device b, all of the profile management functions currently granted to the first device a, and no switching identifier needs to be carried. It should be noted that, in a case in which the authorization information includes at least one authorization credential, if all of the profile management functions granted to the first device a in the at least one first device need to be granted to the first device b in the at least one first device, and if the first device a sends the request message, the request message includes: the identifier of the eUICC, the identifier of the first device a, the authorization credential allocated to the first device a, the identifier of the first device b, and a switching identifier, and the switching identifier is used to instruct to grant, to the first device b, all of the profile management functions currently granted to the first device a. The authorization credential allocated to the first device a is an authorization credential delivered by the eUICC manager before. In this way, after receiving the request message, the eUICC manager learns that all of the profile management functions granted to the first device a need to be granted to the first device b, and further generates the authorization information. Correspondingly, the authorization information further needs to include a switching identifier, and the switching identifier is used to instruct to grant, to the first device b in the at least one first device, all of the profile management functions currently granted to the first device a in the at least one first device.

In addition, for the foregoing case (2), the multiple first devices send the request messages to the eUICC manager at the same time, and each request message carries an identifier and a granted profile management function that are of a respective first device. It is assumed that the eUICC manager receives a first request message sent by the first device a, and receives a second request message sent by the first device b. The first request message includes: the identifier of the eUICC, the identifier of the first device a, and the profile management functions granted to the first device a, and the second request message includes: the identifier of the eUICC, the identifier of the first device b, and the profile management function granted to the first device b. In this way, after receiving the first request message and the second request message, the first device learns which profile management functions are granted to the first device a and which profile management functions are granted to the first device b, and further generates the authorization information.

The first device a and the first device b may be any two first devices in the at least one first device.

It should be noted that, when the first device is a PP, a case in which an authorization request and authorization information include a switching identifier is not involved.

FIG. 2 is a schematic flowchart of Embodiment 2 of a method for authorizing management for an embedded universal integrated circuit card according to the present disclosure. This embodiment is corresponding to the foregoing Embodiment 1. An initiator may be an MNO or an SP, and a first device may be a PM or a PP. Before the following method is performed, the initiator signs contracts with both an eUICC manager and at least one first device, to establish service relationships. As shown in FIG. 2, the method includes:

S201. The eUICC receives encrypted authorization information sent by the eUICC manager or one of the at least one first device.

S202. The eUICC decrypts the encrypted authorization information, to obtain authorization information.

When the authorization information includes an identifier of the at least one first device, S203 is executed; when the authorization information includes at least one authorization credential, S204 is executed.

S203. The eUICC updates, according to the authorization information, an identifier of a first device corresponding to each profile management function in the eUICC.

When the authorization information includes: the identifier of the at least one first device, all profile management functions are granted to the at least one first device, an identifier of an authorized manager is stored in the eUICC, and during updating, the eUICC updates an originally stored device identifier to the identifier of the at least one first device.

S204. The eUICC updates, according to the authorization information, an authorization credential corresponding to each profile management function in the eUICC.

The profile management functions are stored in the eUICC, and the authorization credential corresponding to each profile management function is marked. A device that manages the eUICC needs to carry a correct authorization credential to execute a management operation.

Further, if the authorization information includes the identifier of the at least one first device, the authorization information may further include a granted profile management function corresponding to each first device in the at least one first device. The profile management functions are stored in the eUICC, the identifier of the first device to which each profile management function is granted is marked, and each first device has a unique identifier.

The authorization information may further include a switching identifier, and the switching identifier is used to instruct to grant, to a first device b in the at least one first device, all of profile management functions currently granted to a first device a in the at least one first device.

In another embodiment, when the authorization information includes at least one authorization credential, the authorization information may further include a granted profile management function corresponding to each authorization credential in the at least one authorization credential.

On a basis of the foregoing embodiment, if only some of profiles in the eUICC are targeted, the authorization information may further include an identifier of a profile that is in the eUICC and that is granted to the at least one first device for management.

In a specific implementation process, the eUICC receives the encrypted authorization information sent by the eUICC manager or one (assumed to be the first device a) of the at least one first device. Specifically, (1) the eUICC receives the authorization information that is sent by the eUICC manager and that is encrypted by using a symmetric key between the eUICC manager and the eUICC.

(2) The eUICC receives the authorization information encrypted by the first device a by using a symmetric key between the first device a and the eUICC. It is assumed that the authorization information is sent by the first device a, and herein is the authorization information encrypted by using the symmetric key between the first device a and the eUICC. In this case, the first device a has established a connection to the eUICC, and established the symmetric key between the first device a and the eUICC. It should be noted that, the eUICC manager sends the encrypted authorization information to the first device a after encrypting the authorization information, and then the first device a sends the encrypted authorization information to the eUICC after performing secondary encryption.

(3) The eUICC receives the authorization information encrypted by the first device a by using an obtained public key of the eUICC. It is assumed that the authorization information is sent by the first device a. In this case, the first device a has not managed the eUICC, and the first device a may complete authentication by exchanging a respective certificate with the eUICC, and obtain the public key of the eUICC after completing the authentication. It should be noted that, the eUICC manager sends the encrypted authorization information to the first device a after encrypting the authorization information, and then the first device a sends the encrypted authorization information to the eUICC after performing secondary encryption.

It should be noted that, in the foregoing embodiment, the encrypted authorization information may be a token generated by encrypting the authorization information. In this case, the eUICC manager sends the token including the authorization information to a first device, and the first device encrypts the token, and then forwards the encrypted token to the eUICC. In this case, the first device is a PM. Particularly, the eUICC manager encrypts the token by using the symmetric key shared with the eUICC or the public key of the eUICC, to ensure that the token can be decrypted by only the eUICC.

Figure 3:
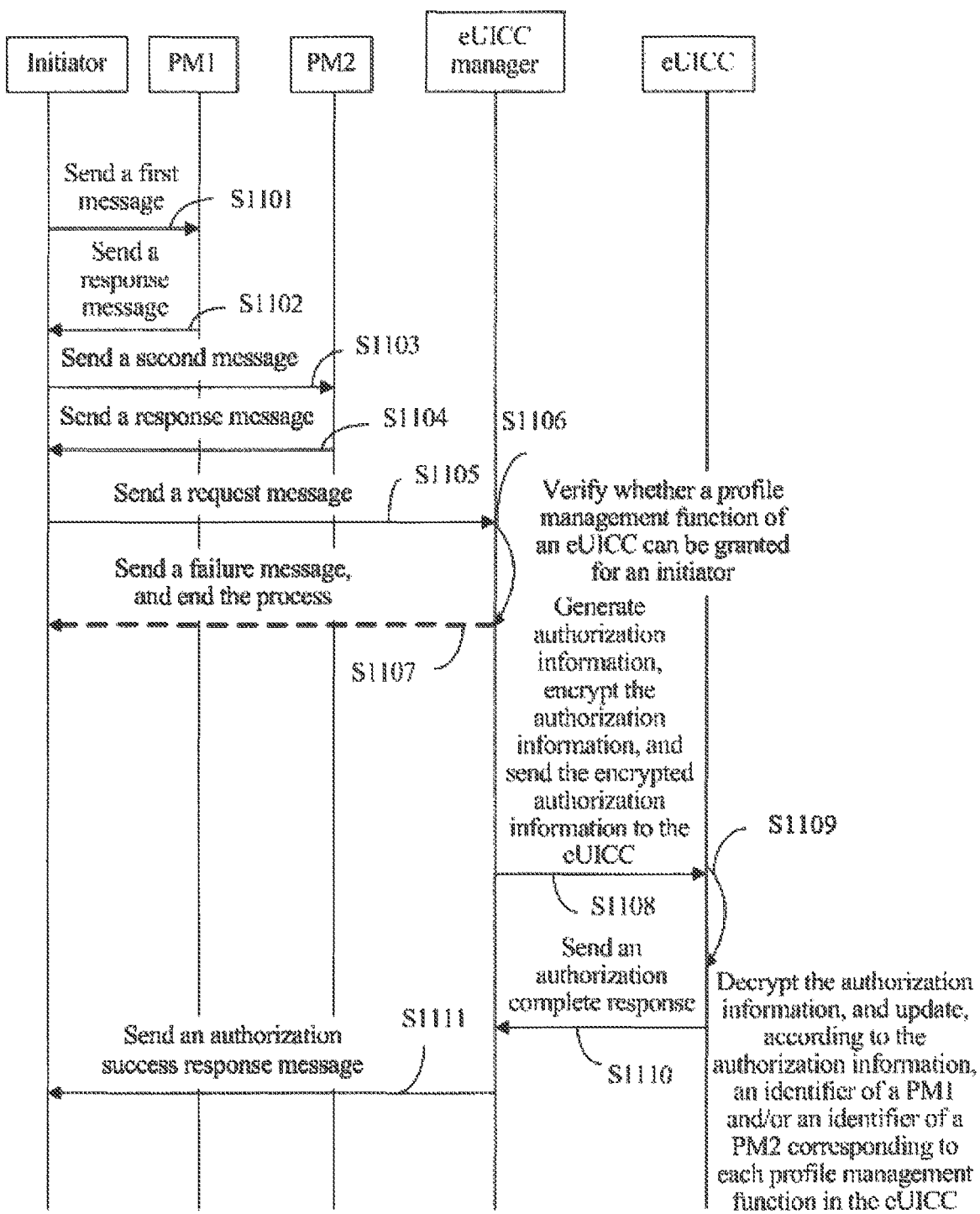
FIG. 3 is a schematic flowchart of Embodiment 3 of a method for authorizing management for an embedded universal integrated circuit card according to the present disclosure.

FIG. 3 is a schematic flowchart of Embodiment 3 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 3, the method includes:

S1101. The initiator sends a first message to the PM1.

Specifically, (1) if the PM1 has currently managed the eUICC, and some of profile management functions currently granted to the PM1 need to be granted to the PM2, or the PM1 manages the profile in the eUICC for the first time, the first message includes an identifier of the eUICC and the profile management functions granted to the PM1. (2) If the PM1 has currently managed the eUICC, and all of profile management functions currently granted to the PM1 need to be granted to the PM2, the first message includes: an identifier of the eUICC, an identifier of the PM2, and a switching identifier, and the switching identifier is used to instruct to grant, to the PM2, all of the profile management functions currently granted to the PM1.

S1102. After completing current profile management functions, the PM1 sends a response message to the initiator.

S1103. The initiator sends a second message to the PM2. The second message is used to notify the PM2 of granted profile management functions.

Specifically, (1) if the PM1 has currently managed the eUICC, and some of the profile management functions currently granted to the PM1 need to be granted to the PM2, the second message includes the identifier of the eUICC and the profile management functions granted to the PM2. (2) If the PM1 has currently managed the eUICC, and all of the profile management functions currently granted to the PM1 need to be granted to the PM2, the second message includes: the identifier of the eUICC, an identifier of the PM1, and a switching identifier, and the switching identifier is used to instruct to grant, to the PM2, all of the profile management functions currently granted to the PM1. It should be noted that, if neither the PM1 nor the PM2 has managed the eUICC, and all of profile management functions need to be granted to the PM2, the second message includes the identifier of the eUICC and the profile management functions granted to the PM2. In this case, S1101 and S1102 do not need to be executed.

S1104. The PM2 sends a response message to the initiator.

S1105. The initiator sends a request message to the eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1106: The eUICC manager verifies whether the profile management functions of the eUICC can be granted for the initiator, and if yes, execute S1108, or otherwise, execute S1107.

S1107. The eUICC manager sends a failure message to the initiator, and the process ends.

S1108. The eUICC manager generates authorization information, and sends the encrypted authorization information to the eUICC after encrypting the authorization information. Specifically, the eUICC manager may encrypt the authorization information by using eUICC management credential. During specific implementation, the encrypted authorization information is actually sent to an eUICC management domain in the eUICC. The eUICC management domain may use the eUICC management credential to verify whether the authorization information originates from a corresponding eUICC manager. That is, if the encrypted authorization information is decrypted successfully by using the eUICC management credential, it is indicated that verification succeeds.

In this embodiment, it is assumed that the authorization information includes the identifier of the PM1 and/or the identifier of the PM2.

S1109. After decrypting the authorization information, the eUICC updates, according to the authorization information, an identifier of the PM1 and/or an identifier of the PM2 corresponding to each profile management function in the eUICC.

In a specific implementation process, the eUICC management domain in the eUICC decrypts the encrypted authorization information to obtain the authorization information, and sends the authorization information to a profile management domain (PMD) in the eUICC, and the PMD adds or deletes the identifier of the PM1 and/or the identifier of the PM2 corresponding to the profile management functions.

S1110. The eUICC sends an authorization complete response to the eUICC manager.

S1111. The eUICC manager sends an authorization success response message to the initiator.

It should be noted that, the PM2 in this embodiment may be replaced by a PP.

Figure 4:
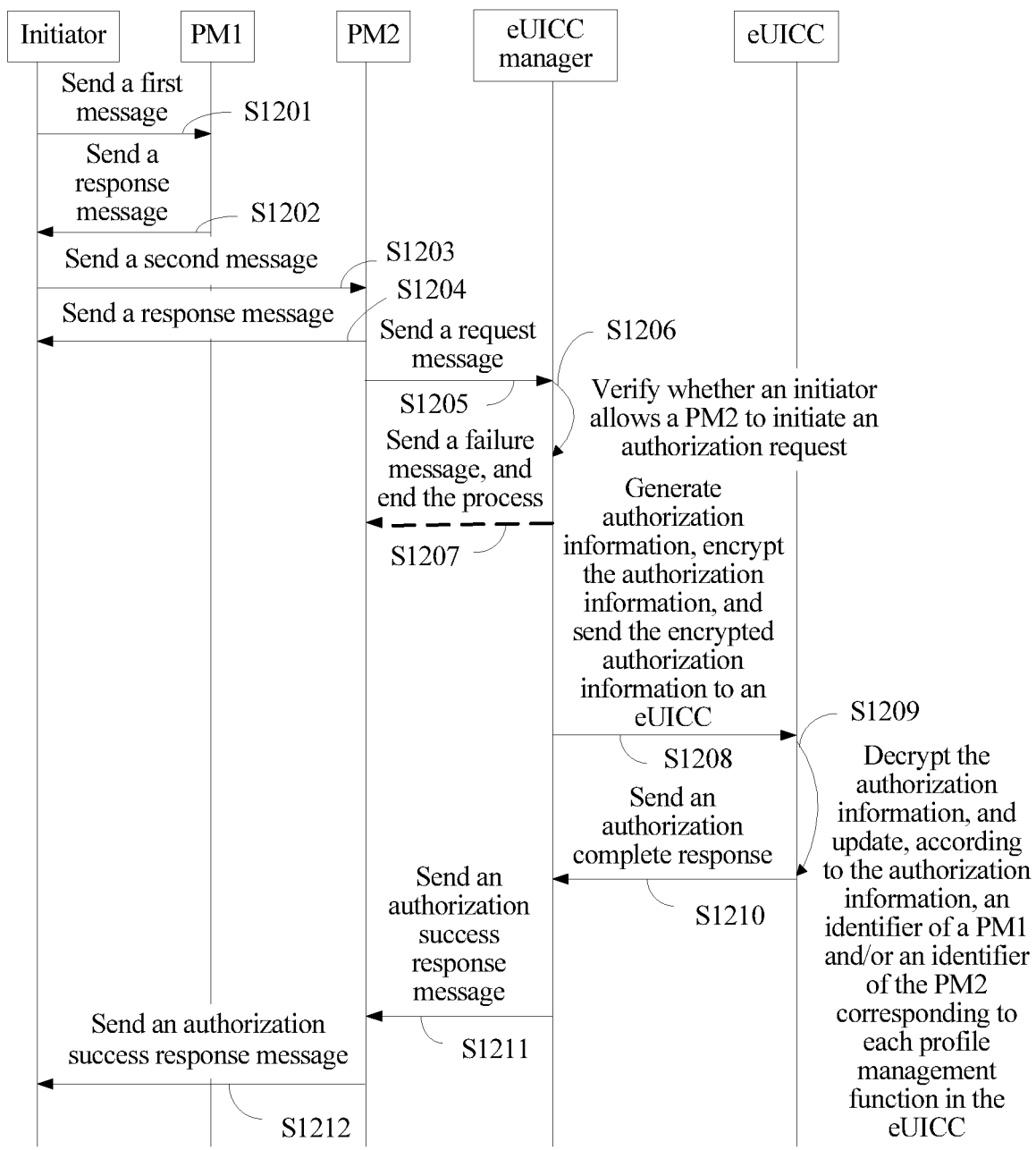
FIG. 4 is a schematic flowchart of Embodiment 4 of a method for authorizing management for an embedded universal integrated circuit card according to the present disclosure.

FIG. 4 is a schematic flowchart of Embodiment 4 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 4, the method includes:

S1201. The initiator sends a first message to the PM1. The first message is used to notify that profile management functions granted to the PM1 are to change.

Specifically, (1) if the PM1 has currently managed the eUICC, and some of the profile management functions currently granted to the PM1 need to be granted to the PM2, or the PM1 manages the profile in the eUICC for the first time, the first message includes an identifier of the eUICC and the profile management functions granted to the PM1. (2) If the PM1 has currently managed the eUICC, and all of the profile management functions currently granted to the PM1 need to be granted to the PM2, the first message includes: an identifier of the eUICC, an identifier of the PM2, and a switching indication, and the switching indication is used to instruct to grant, to the PM2, all of the profile management functions currently granted to the PM1.

S1202. After completing current profile management functions, the PM1 sends a response message to the initiator.

S1203. The initiator sends a second message to the PM2. The message is used to notify the PM2 of granted profile management functions. For specific content of the message, refer to the foregoing embodiment, and details are not described herein again.

Specifically, in this embodiment, the PM2 sends a request message to the eUICC, to request authorization information. (1) If the PM1 has currently managed the eUICC, and some of the profile management functions currently granted to the PM1 need to be granted to the PM2, or the PM1 manages the profile in the eUICC for the first time, the second message includes: the identifier of the eUICC, an identifier of the eUICC manager, an identifier of the PM1, the profile management functions granted to the PM1, and the profile management functions granted to the PM2. (2) If the PM1 has currently managed the eUICC, and all of the profile management functions currently granted to the PM1 need to be granted to the PM2, the second message includes: the identifier of the eUICC, an identifier of the eUICC manager, an identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes: the identifier of the eUICC, an identifier of the eUICC manager, and the profile management functions granted to the PM2. In this case, S1201 and S1202 do not need to be executed.

Because the PM2 sends the request message in the following, to prevent the PM2 from modifying the request message, the initiator may encrypt a parameter in the second message, but does not encrypt some of parameters notified of the PM2. For example, it is assumed that the second message includes: the identifier of the eUICC, the identifier of the eUICC manager, the identifier of the PM1, the profile management functions granted to the PM1, the identifier of the PM2, and the profile management functions granted to the PM2. Encrypted parameters include: the identifier of the eUICC, the identifier of the eUICC manager, the identifier of the PM1, the profile management functions granted to the PM1, the identifier of the PM2, and the profile management functions granted to the PM2. In addition, the following unencrypted parameters are further included: the identifier of the eUICC and the profile management functions granted to the PM2.

S1204. The PM2 sends a response message to the initiator. If the PM2 has not currently managed the eUICC, a connection needs to be established for the first time, and the PM2 needs to check a connection establishment condition.

S1205. The PM2 sends a request message to the eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1206. The eUICC manager verifies whether the initiator allows the PM2 to initiate the request message, and if yes, execute S1208, or otherwise, execute S1207.

S1207. The eUICC manager sends a failure message to the PM2, and the process ends.

S1208. The eUICC manager generates authorization information, and sends the encrypted authorization information to the eUICC after encrypting the authorization information. The eUICC manager may encrypt the authorization information by using eUICC management credential. During specific implementation, the encrypted authorization information is actually sent to an eUICC management domain in the eUICC. The eUICC management domain may use the eUICC management credential to verify whether the authorization information originates from a corresponding eUICC manager. That is, if the encrypted authorization information is decrypted successfully by using the eUICC management credential, it is indicated that verification succeeds.

In this embodiment, it is assumed that the authorization information includes the identifier of the PM1 and/or the identifier of the PM2.

S1209. After decrypting the authorization information, the eUICC updates, according to the authorization information, an identifier of the PM1 and/or an identifier of the PM2 corresponding to each profile management function in the eUICC.

In a specific implementation process, the eUICC management domain in the eUICC decrypts the encrypted authorization information to obtain the authorization information, and sends the authorization information to a PMD in the eUICC, and the PMD adds or deletes the identifier of the PM1 and/or the identifier of the PM2 corresponding to the profile management functions.

S1210. The eUICC sends an authorization complete response to the eUICC manager.

S1211. The eUICC manager sends an authorization success response to the PM2.

S1212. The PM2 sends an authorization success response to the initiator.

Figure 5:
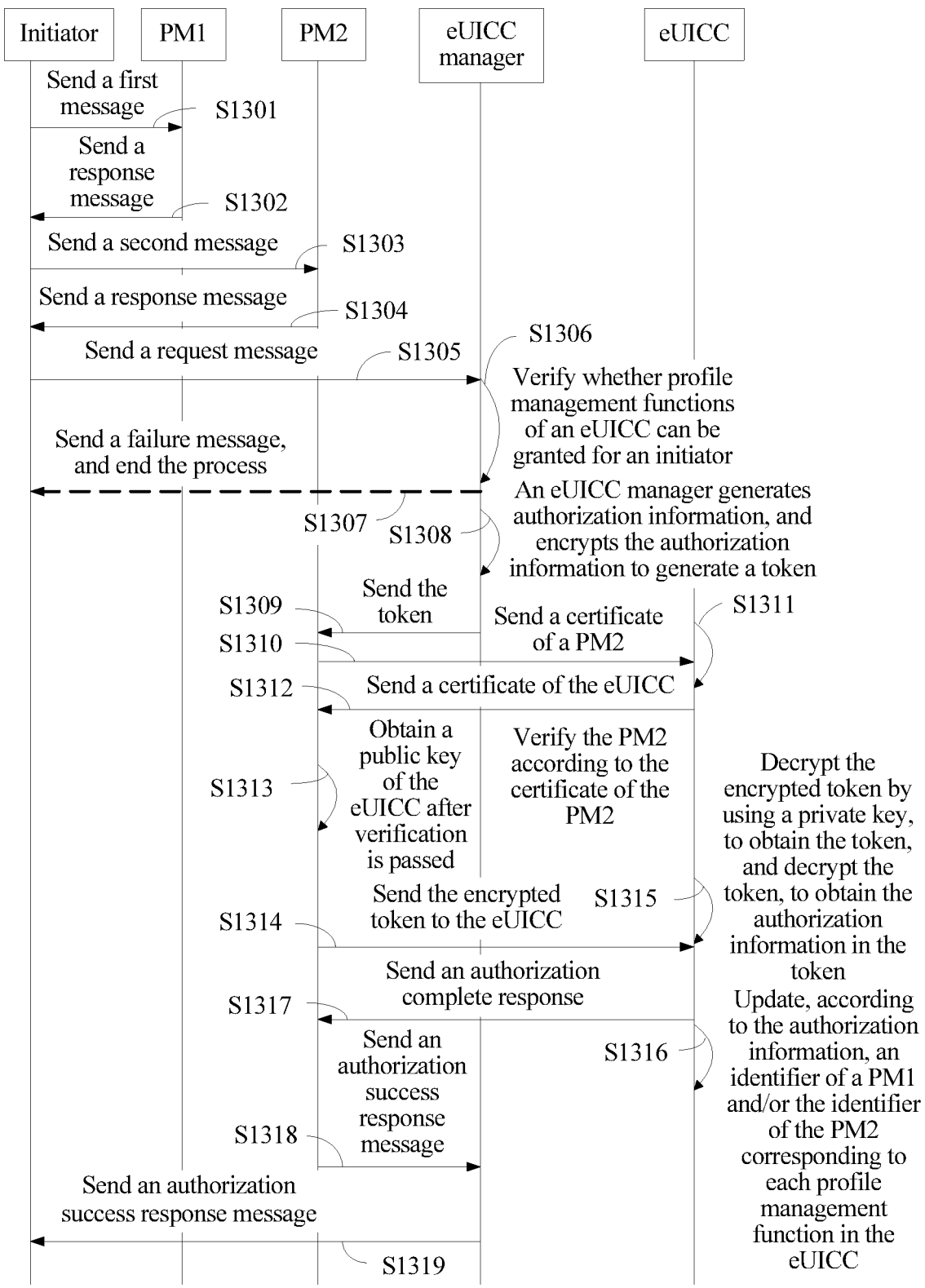
FIG. 5 is a schematic flowchart of Embodiment 5 of a method for authorizing management for an embedded universal integrated circuit card according to the present disclosure.

FIG. 5 is a schematic flowchart of Embodiment 5 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 5, the method includes:

S1301. The initiator sends a first message to the PM1. The first message is used to notify that profile management functions granted to the PM1 are to change.

Specifically, (1) if the PM1 has currently managed the eUICC, and some of the profile management functions currently granted to the PM1 need to be granted to the PM2, or the PM1 manages the profile in the eUICC for the first time, the first message includes an identifier of the eUICC and the profile management functions granted to the PM1. (2) If the PM1 has currently managed the eUICC, and all of the profile management functions currently granted to the PM1 need to be granted to the PM2, the first message includes: an identifier of the eUICC, an identifier of the PM2, and a switching identifier, and the switching identifier is used to instruct to grant, to the PM2, all of the profile management functions currently granted to the PM1.

S1302. After completing current profile management functions, the PM1 sends a response message to the initiator.

S1303. The initiator sends a second message to the PM2. The second message is used to notify the PM2 of granted profile management functions.

Specifically, (1) if the PM1 has currently managed the eUICC, and some of the profile management functions currently granted to the PM1 need to be granted to the PM2, or the PM1 manages the profile in the eUICC for the first time, the second message includes the identifier of the eUICC and the profile management functions granted to the PM2. (2) If the PM1 has currently managed the eUICC, and all of the profile management functions currently granted to the PM1 need to be granted to the PM2, the second message includes: the identifier of the eUICC, an identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes the identifier of the eUICC and the profile management functions granted to the PM2. In this case, S1301 and S1302 do not need to be executed.

S1304. The PM2 sends a response message to the initiator. If the PM2 has not currently managed the eUICC, a connection needs to be established for the first time, and the PM2 needs to check a connection establishment condition.

S1305. The initiator sends a request message to the eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1306. The eUICC manager verifies whether the profile management functions of the eUICC can be granted for the initiator, and if yes, execute S1308, or otherwise, execute S1307.

S1307. The eUICC manager sends a failure message to the initiator, and the process ends.

It should be noted that, in this embodiment, S1305 may be replaced by that the PM2 sends a request message to the eUICC manager. In this way, content included in the second message changes. (1) If the PM1 has currently managed the eUICC, and some of the profile management functions currently granted to the PM1 need to be granted to the PM2, or the PM1 manages the profile in the eUICC for the first time, the second message includes: the identifier of the eUICC, an identifier of the eUICC manager, the identifier of the PM1, the profile management functions granted to the PM1, and the profile management functions granted to the PM2. (2) If the PM1 has currently managed the eUICC, and all of the profile management functions currently granted to the PM1 need to be granted to the PM2, the second message includes: the identifier of the eUICC, an identifier of the eUICC manager, the identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes: the identifier of the eUICC, an identifier of the eUICC manager, and the profile management functions granted to the PM2.

Correspondingly, S1306 is replaced by that the eUICC manager verifies whether the initiator allows the PM2 to initiate the request message, and if yes, execute subsequent steps, or otherwise, send a failure message to the PM2, and the process ends.

S1308. The eUICC manager generates authorization information, and encrypts the authorization information to generate a token.

S1309. The eUICC manager sends the token to the PM2.

It should be noted that, the eUICC manager encrypts the token by using a symmetric key shared with the eUICC or a public key of the eUICC, to ensure that the token can be decrypted by only the eUICC, and another device such as the PM1 or the PM2 cannot decrypt the token.

S1310. The PM2 sends a certificate of the PM2 to the eUICC. The certificate of the PM2 includes an identifier of the PM2.

S1311. The eUICC verifies the PM2 according to the certificate of the PM2, and if verification succeeds, execute S1312, or otherwise, skip executing subsequent steps.

S1312. The eUICC sends a certificate of the eUICC to the PM2, so that the PM2 determines, according to the certificate of the eUICC, that the eUICC is an eUICC that the initiator requests for managing.

S1313. The PM2 verifies the certificate of the eUICC by using a public key of a certificate authority (CA), and obtains a public key of the eUICC after verification succeeds.

S1314. The PM2 encrypts the token by using the public key of the eUICC, and sends the encrypted token to the eUICC. In this way, only the eUICC can decrypt the encrypted token by using a private key of the eUICC.

It should be noted that, if the PM2 has managed the eUICC before, S1310-S1314 do not need to be executed, and the PM2 may directly encrypt the token by using a symmetric key between the PM2 and the eUICC.

S1315. The eUICC decrypts the encrypted token by using a private key, to obtain the token, and decrypts the token, to obtain the authorization information in the token. In a specific implementation process, an eUICC controlling authority security domain (ECASD) in the eUICC decrypts the encrypted token by using the private key, and sends the decrypted token to an eUICC management domain in the eUICC, and the eUICC management domain decrypts the token by using eUICC management credential, to obtain the authorization information, and sends the authorization information to a PMD in the eUICC.

In this embodiment, it is assumed that the authorization information includes the identifier of the PM1 and/or the identifier of the PM2.

S1316. The eUICC updates, according to the authorization information, an identifier of the PM1 and/or the identifier of the PM2 corresponding to each profile management function in the eUICC. Specifically, updating may be completed by the PMD in the eUICC.

S1317. The eUICC sends an authorization complete response to the PM2.

S1318. The PM2 sends an authorization success response to the eUICC manager.

S1319. The eUICC manager sends an authorization success response to the initiator.

Figure 6:
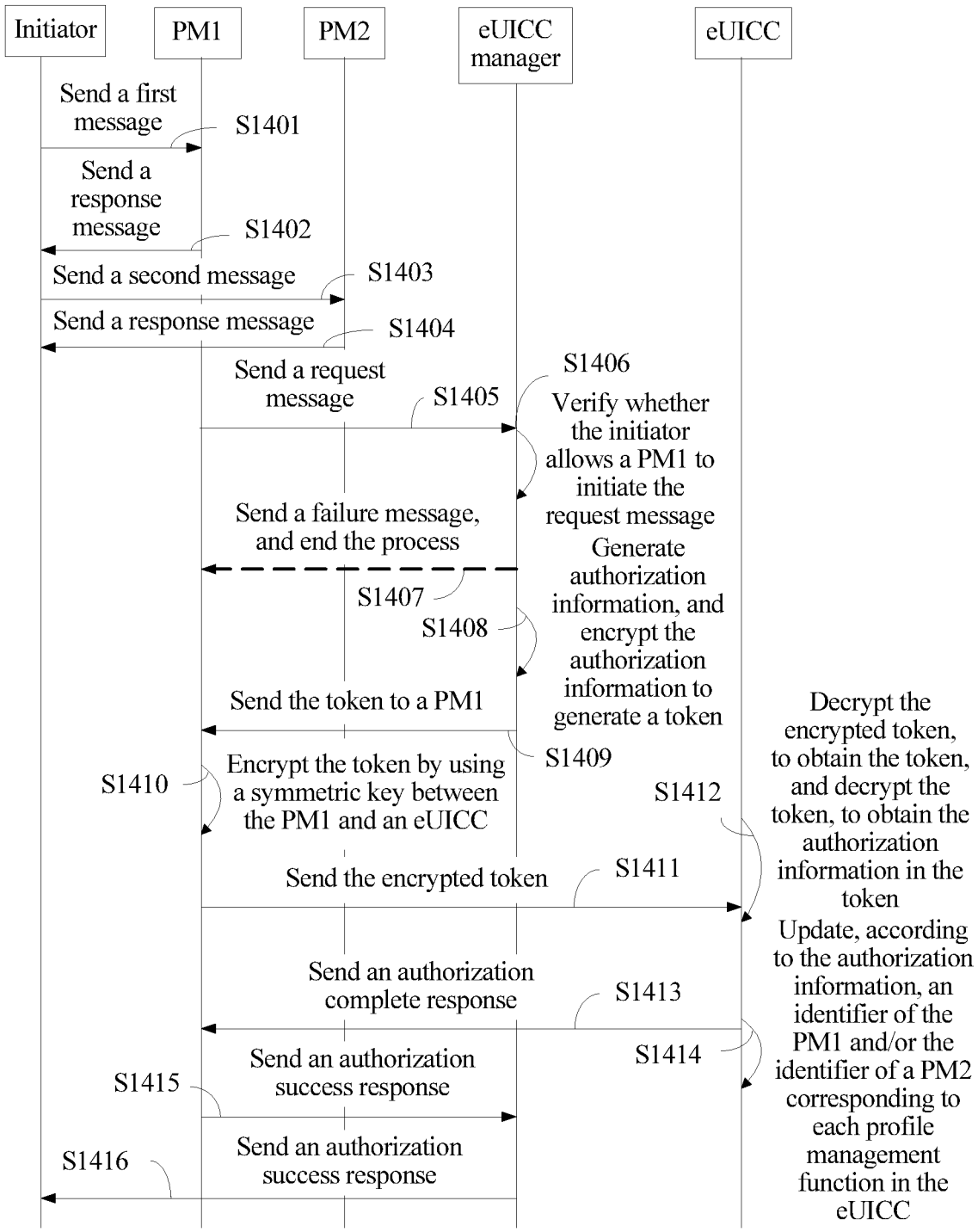
FIG. 6 is a schematic flowchart of Embodiment 6 of a method for authorizing management for an embedded universal integrated circuit card according to the present disclosure.

FIG. 6 is a schematic flowchart of Embodiment 6 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 6, the method includes:

S1401. The initiator sends a first message to the PM1. The first message is used to notify that profile management functions granted to the PM1 are to change.

Specifically, in this embodiment, the PM1 sends a request message to the eUICC, to request authorization information. (1) If the PM1 has currently managed the eUICC, and some of the profile management functions currently granted to the PM1 need to be granted to the PM2, or the PM1 manages the profile in the eUICC for the first time, the first message includes: an identifier of the eUICC, an identifier of the eUICC manager, an identifier of the PM2, the profile management functions granted to the PM1, and profile management functions granted to the PM2. (2) If the PM1 has currently managed the eUICC, and all of the profile management functions currently granted to the PM1 need to be granted to the PM2, the first message includes: an identifier of the eUICC, an identifier of the eUICC manager, an identifier of the PM2, and a switching identifier, and the switching indication is used to instruct to grant, to the PM2, all of the profile management functions currently granted to the PM1.

Because the PM1 sends the request message in the following, to prevent the PM1 from modifying the request message, the initiator may encrypt a parameter in the first message, but does not encrypt some of parameters notified of the PM1. For example, it is assumed that the first message includes: the identifier of the eUICC, the identifier of the eUICC manager, the identifier of the PM2, the profile management functions granted to the PM1, and the profile management functions granted to the PM2. Encrypted parameters include: the identifier of the eUICC, the identifier of the eUICC manager, the identifier of the PM2, the profile management functions granted to the PM1, and the profile management functions granted to the PM2. In addition, the following unencrypted parameters are further included: the identifier of the eUICC and the profile management functions granted to the PM1.

S1402. After completing current profile management functions, the PM1 sends a response message to the initiator.

S1403. The initiator sends a second message to the PM2. The second message is used to notify the PM2 of the granted profile management functions.

Specifically, (1) if the PM1 has currently managed the eUICC, and some of the profile management functions currently granted to the PM1 need to be granted to the PM2, or the PM1 manages the profile in the eUICC for the first time, the second message includes the identifier of the eUICC and the profile management functions granted to the PM2. (2) If the PM1 has currently managed the eUICC, and all of the profile management functions currently granted to the PM1 need to be granted to the PM2, the second message includes: the identifier of the eUICC, an identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes the identifier of the eUICC and the profile management functions granted to the PM2. In this case, S1401 and S1402 do not need to be executed.

S1404. The PM2 sends a response message to the initiator. If the PM2 has not currently managed the eUICC, a connection needs to be established for the first time, and the PM2 needs to check a connection establishment condition.

S1405. The PM1 sends a request message to an eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1406. The eUICC manager verifies whether the initiator allows the PM1 to initiate the request message, and if yes, execute S1408, or otherwise, execute S1407.

S1407. The eUICC manager sends a failure message to the PM1, and the process ends.

S1408. The eUICC manager generates authorization information, and encrypts the authorization information to generate a token.

S1409. The eUICC manager sends the token to the PM1. This step may be replaced by that the eUICC manager sends the token to the PM2, and the PM2 forwards the token to the PM1.

S1410. The PM1 encrypts the token by using a symmetric key between the PM1 and the eUICC. Because the PM1 has established a connection to the eUICC, and manages the eUICC, in this case, the PM1 has the symmetric key between the PM1 and the eUICC.

S1411. The PM1 sends the encrypted token to the eUICC.

S1412. The eUICC decrypts the encrypted token, to obtain the token, and decrypts the token, to obtain the authorization information in the token. In a specific implementation process, a PMD in the eUICC decrypts the encrypted token by using the same symmetric key, to obtain the token, and sends the token to an eUICC management domain in the eUICC, and the eUICC management domain decrypts the token by using eUICC management credential, to obtain the authorization information, and sends the authorization information to the PMD in the eUICC.

In this embodiment, it is assumed that the authorization information includes the identifier of the PM1 and/or the identifier of the PM2.

S1413. The eUICC updates, according to the authorization information, an identifier of the PM1 and/or an identifier of the PM2 corresponding to each profile management function in the eUICC. Specifically, updating may be completed by the PMD in the eUICC.

S1414. The eUICC sends an authorization complete response to the PM1.

S1415. The PM1 sends an authorization success response to the eUICC manager.

S1416. The eUICC manager sends an authorization success response to the initiator.

Figure 7:
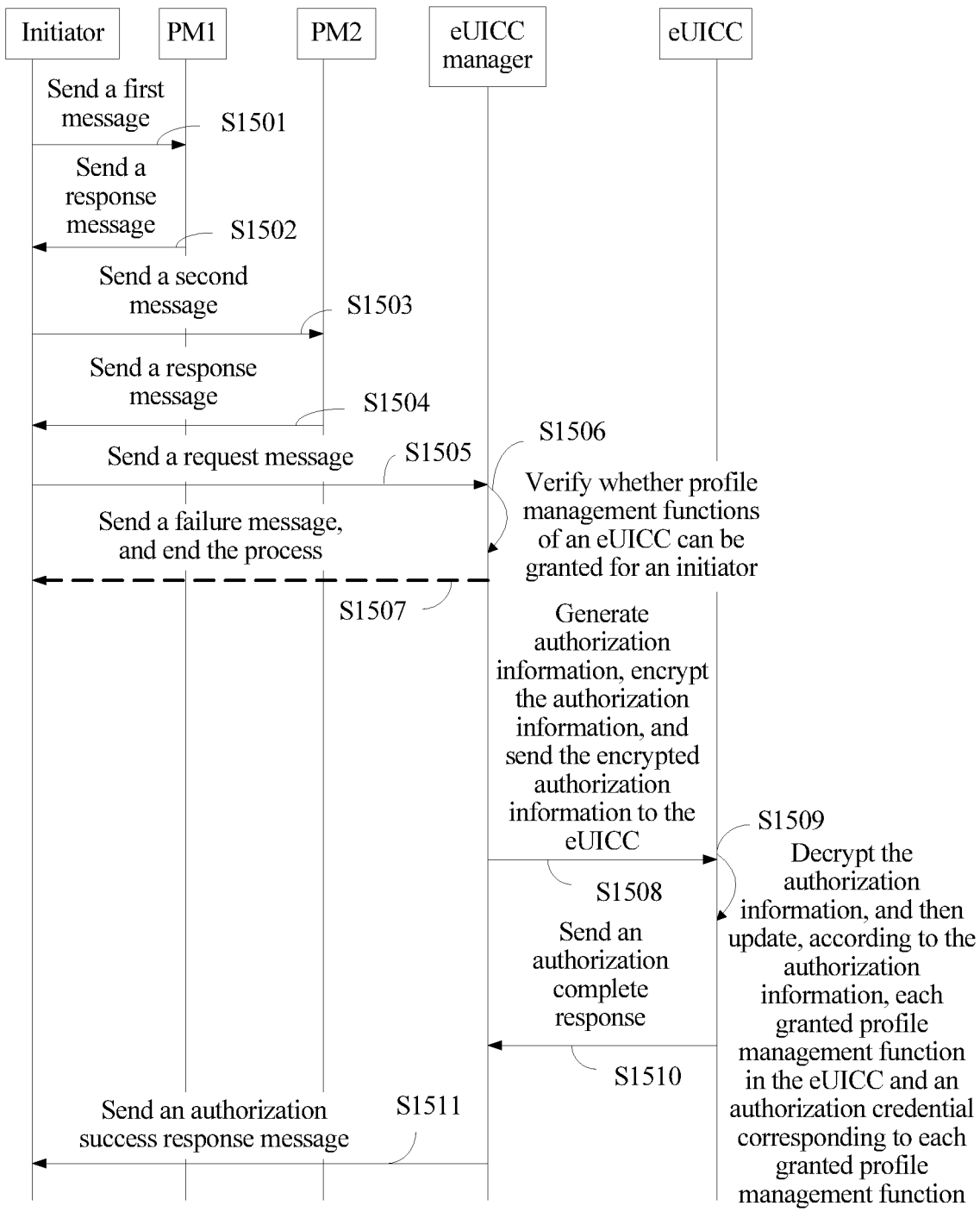
FIG. 7 is a schematic flowchart of Embodiment 7 of a method for authorizing management for an embedded universal integrated circuit card according to the present disclosure.

FIG. 7 is a schematic flowchart of Embodiment 7 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 7, the method includes:

S1501. The initiator sends a first message to the PM1.

Specifically, (1) if the PM1 has currently managed the eUICC, and some of profile management functions currently granted to the PM1 need to be granted to the PM2, or the PM1 manages the profile in the eUICC for the first time, the first message includes an identifier of the eUICC and the profile management functions granted to the PM1. (2) If the PM1 has currently managed the eUICC, and all of profile management functions currently granted to the PM1 need to be granted to the PM2, the first message includes: an identifier of the eUICC, an identifier of the PM2, and a switching indication, and the switching indication is used to instruct to grant, to the PM2, all of the profile management functions currently granted to the PM1.

S1502. After completing current profile management functions, the PM1 sends a response message to the initiator.

S1503. The initiator sends a second message to the PM2. The second message is used to notify the PM2 of granted profile management functions.

Specifically, (1) if the PM1 has currently managed the eUICC, and some of the profile management functions currently granted to the PM1 need to be granted to the PM2, or the PM1 manages the profile in the eUICC for the first time, the second message includes the identifier of the eUICC and the profile management functions granted to the PM2. (2) If the PM1 has currently managed the eUICC, and all of the profile management functions currently granted to the PM1 need to be granted to the PM2, the second message includes: the identifier of the eUICC, an identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes the identifier of the eUICC and the profile management functions granted to the PM2. In this case, S1501 and S1502 do not need to be executed.

S1504. The PM2 sends a response message to the initiator.

S1505. The initiator sends a request message to the eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1506: The eUICC manager verifies whether the profile management functions of the eUICC can be granted for the initiator, and if yes, execute S1508, or otherwise, execute S1507.

S1507. The eUICC manager sends a failure message to the initiator, and the process ends.

S1508. The eUICC manager generates authorization information, and sends the encrypted authorization information to the eUICC after encrypting the authorization information. This step may be replaced by that the eUICC manager generates the authorization information, and sends the encrypted authorization information to the PM1 after encrypting the authorization information; then the PM1 sends the encrypted authorization information to the eUICC, or the PM1 sends the encrypted authorization information to the PM2, and the PM2 sends the encrypted authorization information to the eUICC.

In this embodiment, the authorization information includes: each granted profile management function and an authorization credential corresponding to each granted profile management function.

S1509. After decrypting the authorization information, the eUICC updates, according to the authorization information, each granted profile management function in the eUICC and an authorization credential corresponding to each granted profile management function. Specifically, updating may be performed with reference to content in Table 5.

In a specific implementation process, an eUICC management domain in the eUICC decrypts the encrypted authorization information to obtain the authorization information, and sends the authorization information to a PMD in the eUICC, and the PMD updates each granted profile management function in the eUICC and an authorization credential corresponding to each granted profile management function.

S1510. The eUICC sends an authorization complete response to the eUICC manager.

S1511. The eUICC manager sends an authorization success response to the initiator.

Figure 8:
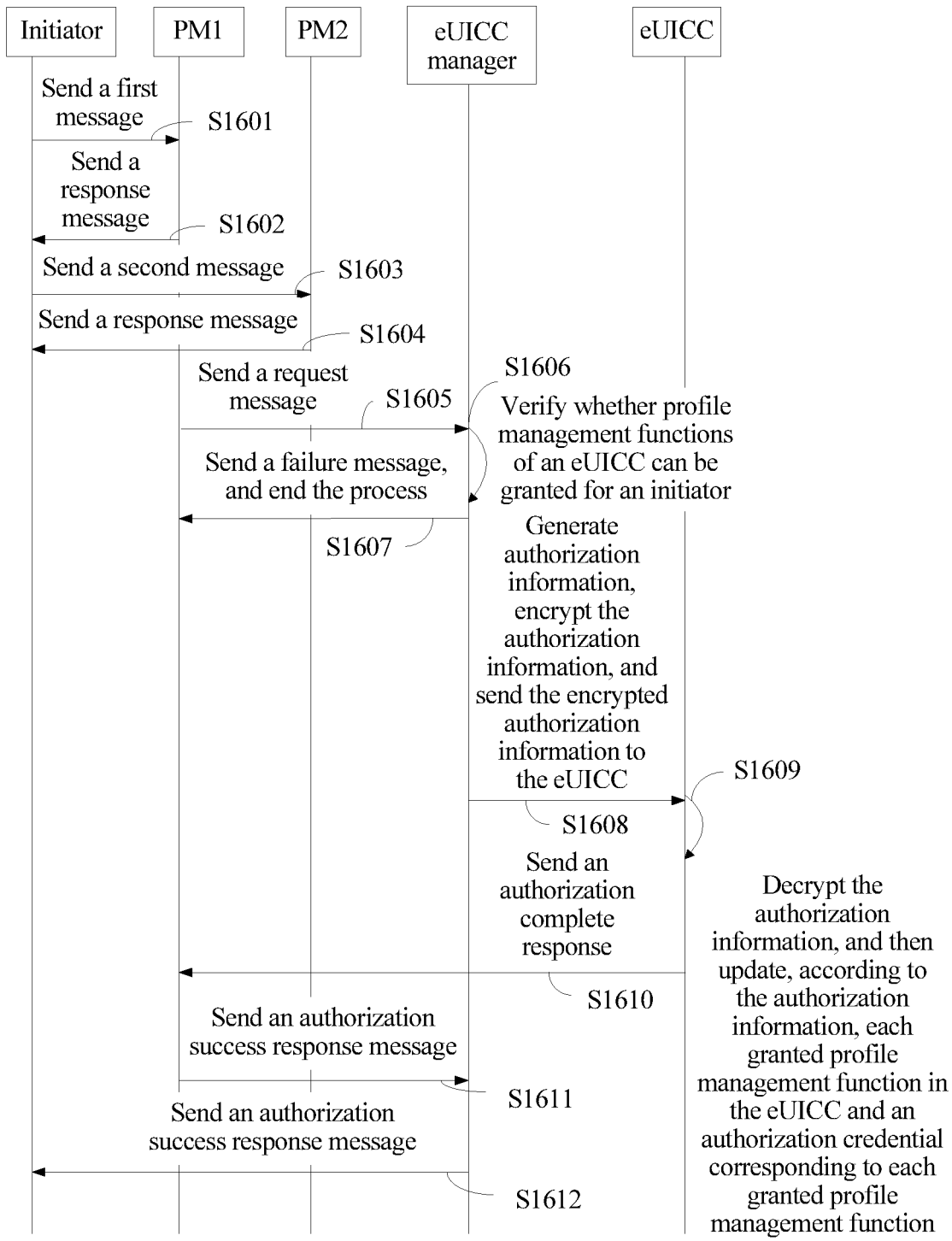
FIG. 8 is a schematic flowchart of Embodiment 8 of a method for authorizing management for an embedded universal integrated circuit card according to the present disclosure.

FIG. 8 is a schematic flowchart of Embodiment 8 of a method for authorizing management for an embedded universal integrated circuit card according to the present disclosure. On a basis of the foregoing embodiment, it is assumed that the foregoing at least one first device includes two first devices, one is a PM1, and the other is a PM2. By using an initiator, the PM1, the PM2, an eUICC manager, and an eUICC as an example, a complete process of the foregoing method embodiment is described. It should be noted that, before the following method is performed, the initiator signs contracts with all the PM1, the PM2, and the eUICC manager, to establish service relationships. A profile in the eUICC needs to be managed by a PM. As shown in FIG. 8, the method includes:

S1601. The initiator sends a first message to the PM1. The first message is used to notify that profile management functions granted to the PM1 are to change.

Specifically, in this embodiment, the PM1 sends a request message to the eUICC, to request authorization information. (1) If the PM1 has currently managed the eUICC, and some of the profile management functions currently granted to the PM1 need to be granted to the PM2, the first message includes: an identifier of the eUICC, an identifier of the eUICC manager, an identifier of the PM2, the profile management functions granted to the PM1, and profile management functions granted to the PM2. (2) If the PM1 has currently managed the eUICC, and all of the profile management functions currently granted to the PM1 need to be granted to the PM2, the first message includes: an identifier of the eUICC, an identifier of the eUICC manager, an identifier of the PM2, and a switching identifier, and the switching indication is used to instruct to grant, to the PM2, all of the profile management functions currently granted to the PM1.

Because the PM1 sends the request message in the following, to prevent the PM1 from modifying the request message, the initiator may encrypt a parameter in the first message, but does not encrypt some of parameters notified of the PM1. For example, it is assumed that the first message includes: the identifier of the eUICC, the identifier of the eUICC manager, the identifier of the PM2, the profile management functions granted to the PM1, and the profile management functions granted to the PM2. Encrypted parameters include: the identifier of the eUICC, the identifier of the eUICC manager, the identifier of the PM2, the profile management functions granted to the PM1, and the profile management functions granted to the PM2. In addition, the following unencrypted parameters are further included: the identifier of the eUICC and the profile management functions granted to the PM1.

S1602. After completing current profile management functions, the PM1 sends a response message to the initiator.

S1603. The initiator sends a second message to the PM2. The message is used to notify the PM2 of the granted profile management functions.

Specifically, (1) if the PM1 has currently managed the eUICC, and some of the profile management functions currently granted to the PM1 need to be granted to the PM2, the second message includes the identifier of the eUICC and the profile management functions granted to the PM2. (2) If the PM1 has currently managed the eUICC, and all of the profile management functions currently granted to the PM1 need to be granted to the PM2, the second message includes: the identifier of the eUICC, an identifier of the PM1, and a switching identifier, and the switching identifier is used to instruct to grant, to the PM2, all of the profile management functions currently granted to the PM1. It should be noted that, if neither the PM1 nor the PM2 has currently managed the eUICC, and all of profile management functions need to be granted to the PM2, the second message includes the identifier of the eUICC and the profile management functions granted to the PM2. In this case, S1601 and S1602 do not need to be executed.

S1604. The PM2 sends a response message to the initiator. If the PM2 has not currently managed the eUICC, a connection needs to be established for the first time, and the PM2 needs to check a connection establishment condition.

S1605. The PM1 sends a request message to the eUICC manager. The request message is used to request the eUICC manager to grant profile management functions of the eUICC, for example, grant some of the profile management functions to the PM1, and grant some of the profile management functions to the PM2.

For specific content of the request message, refer to the foregoing embodiment, and details are not described herein again.

S1606. The eUICC manager verifies whether the initiator allows the PM1 to initiate the request message, and if yes, execute S1608, or otherwise, execute S1607.

S1607. The eUICC manager sends a failure message to the PM1, and the process ends.

S1608. The eUICC manager generates authorization information, and sends the encrypted authorization information to the eUICC after encrypting the authorization information. The eUICC manager may encrypt the authorization information by using eUICC management credential. During specific implementation, the encrypted authorization information is actually sent to an eUICC management domain in the eUICC.

In this embodiment, the authorization information includes: each granted profile management function and an authorization credential corresponding to each granted profile management function. For details, refer to Embodiment 5 and Embodiment 6.

S1609. After decrypting the authorization information, the eUICC updates, according to the authorization information, each granted profile management function in the eUICC and an authorization credential corresponding to each granted profile management function. Specifically, updating may be performed with reference to content in Table 5.

In a specific implementation process, the eUICC management domain in the eUICC decrypts the encrypted authorization information to obtain the authorization information, and sends the authorization information to a PMD in the eUICC, and the PMD updates each granted profile management function in the eUICC and an authorization credential corresponding to each granted profile management function.

S1610. The eUICC sends an authorization complete response to the PM1.

S1611. The PM1 sends an authorization success response to the eUICC manager.

S1612. The eUICC manager sends an authorization success response to the initiator.

It should be noted that, in the foregoing embodiments, a sequence in which the initiator sends a first message and a second message is not strictly limited. A quantity of PM1 and PM2 in the foregoing embodiments is not limited, and the PM2 may be replaced by a PP, but after the PM2 is replaced by the PP, the request message is always sent to the eUICC manager by the initiator.

In addition, it should be noted that, some steps in the foregoing embodiments may be interchanged and recombined to form new embodiments, and the specification is not intended to be exhaustive.

Figure 9:
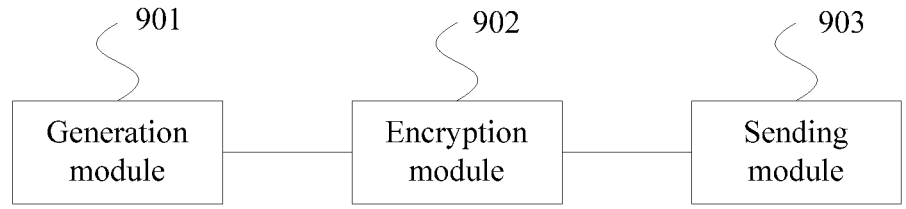
FIG. 9 is a schematic structural diagram of Embodiment 1 of an apparatus for authorizing management for an embedded universal integrated circuit card according to the present disclosure.

FIG. 9 is a schematic structural diagram of Embodiment 1 of an apparatus for authorizing management for an embedded universal integrated circuit card according to the present disclosure, and the apparatus may be integrated in an eUICC manager. As shown in FIG. 9, the apparatus includes: a generation module 901, an encryption module 902, and a sending module 903, where: the generation module 901 is configured to: generate authorization information, and send the authorization information to the encryption module 902; the encryption module 902 is configured to: encrypt the authorization information by using eUICC management credential, and send the encrypted authorization information to the sending module 903; and the sending module 903 is configured to send the encrypted authorization information to an eUICC, where the authorization information includes an identifier of at least one first device, or the authorization information includes at least one authorization credential.

Further, when the authorization information includes the identifier of the at least one first device, the authorization information further includes a granted profile management function corresponding to each first device in the at least one first device.

The authorization information may further include a switching identifier, and the switching identifier is used to instruct to grant, to a first device b in the at least one first device, all of profile management functions currently granted to a first device a in the at least one first device.

Further, the generation module 901 is further configured to: when the authorization information includes at least one authorization credential, send each authorization credential in the at least one authorization credential to a corresponding first device in the at least one first device.

Further, when the authorization information includes at least one authorization credential, the authorization information may further include a granted profile management function corresponding to each authorization credential in the at least one authorization credential.

The sending module 903 is further configured to: when the authorization information includes an authorization credential corresponding to the first device a in the at least one first device and the profile management functions granted to the first device a, send, to the first device a, the authorization credential corresponding to the first device a in the authorization information and the profile management functions granted to the first device a in the authorization information.

On a basis of the foregoing embodiment, the authorization information further includes an identifier of a profile that is in the eUICC and that is granted to the at least one first device for management.

In a specific implementation process, the sending module 903 may be further specifically configured to: send the encrypted authorization information to a first device a in the at least one first device, where the encrypted authorization information is sent to the eUICC by the first device a; or send the encrypted authorization information to a first device a in the at least one first device, where the encrypted authorization information is sent to a second device by the first device a, and is then sent to the eUICC by the second device.

The apparatus is configured to execute the foregoing method embodiment, implementation principles and technical effects thereof are similar, and details are not described herein again.

Figure 10:
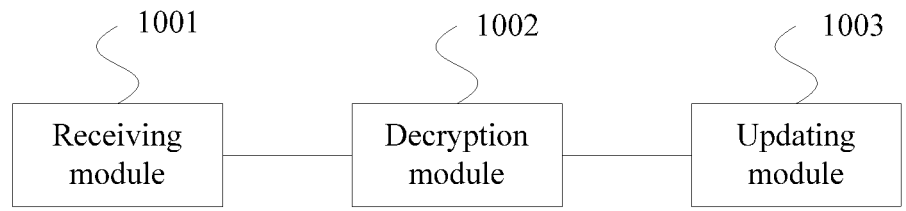
FIG. 10 is a schematic structural diagram of Embodiment 2 of an apparatus for authorizing management for an embedded universal integrated circuit card according to the present disclosure.

FIG. 10 is a schematic structural diagram of Embodiment 2 of an apparatus for authorizing management for an embedded universal integrated circuit card according to the present disclosure, and the apparatus may be integrated in an eUICC. As shown in FIG. 10, the apparatus includes: a receiving module 1001, a decryption module 1002, and an updating module 1003, where: the receiving module 1001 is configured to: receive encrypted authorization information sent by an eUICC manager or one of at least one first device, and send the encrypted authorization information to the decryption module 1002; the decryption module 1002 is configured to: decrypt the encrypted authorization information to obtain authorization information, and send the authorization information to the updating module 1003; and the updating module 1003 is configured to: when the authorization information includes an identifier of the at least one first device, update, according to the authorization information, an identifier of a first device corresponding to each profile management function in an eUICC; or the updating module 1003 is configured to: when the authorization information includes at least one authorization credential, update, according to the authorization information, an authorization credential corresponding to each profile management function in the eUICC.

Further, when the authorization information includes the identifier of the at least one first device, the authorization information further includes a granted profile management function corresponding to each first device in the at least one first device.

The authorization information may further include a switching identifier, and the switching identifier is used to instruct to grant, to a first device b in the at least one first device, all of profile management functions currently granted to a first device a in the at least one first device.

In addition, when the authorization information includes the at least one authorization credential, the authorization information further includes a granted profile management function corresponding to each authorization credential in the at least one authorization credential.

On a basis of the foregoing embodiment, the authorization information further includes an identifier of a profile that is in the eUICC and that is granted to the at least one first device for management.

The apparatus is configured to execute the foregoing method embodiment, implementation principles and technical effects thereof are similar, and details are not described herein again.

Figure 11:
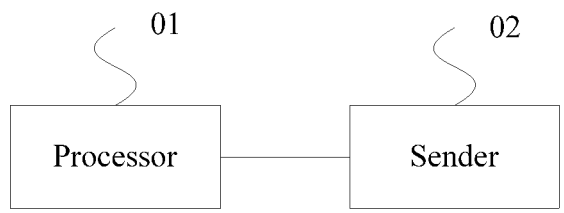
FIG. 11 is a schematic structural diagram of Embodiment 3 of an apparatus for authorizing management for an embedded universal integrated circuit card according to the present disclosure.

FIG. 11 is a schematic structural diagram of Embodiment 3 of an apparatus for authorizing management for an embedded universal integrated circuit card according to the present disclosure, and the apparatus may be integrated in an eUICC manager. As shown in FIG. 11, the apparatus includes a processor 01 and a sender 02, where: the processor 01 is configured to: generate authorization information, and encrypt the authorization information by using eUICC management credential; and the sender 02 is configured to send the encrypted authorization information to an eUICC, where the authorization information includes an identifier of at least one first device, or the authorization information includes at least one authorization credential.

Further, when the authorization information includes the identifier of the at least one first device, the authorization information further includes a granted profile management function corresponding to each first device in the at least one first device.

On a basis of this, the authorization information may further include a switching identifier, and the switching identifier is used to instruct to grant, to a first device b in the at least one first device, all of profile management functions currently granted to a first device a in the at least one first device.

In addition, the sender 02 is configured to: when the authorization information includes the at least one authorization credential, send each authorization credential in the at least one authorization credential to a corresponding first device in the at least one first device.

When the authorization information includes the at least one authorization credential, the authorization information further includes a granted profile management function corresponding to each authorization credential in the at least one authorization credential.

The sender 02 is further configured to: when the authorization information includes an authorization credential corresponding to the first device a in the at least one first device and the profile management functions granted to the first device a, send, to the first device a, the authorization credential corresponding to the first device a in the authorization information and the profile management functions granted to the first device a in the authorization information.

On a basis of the foregoing embodiment, the authorization information further includes an identifier of a profile that is in the eUICC and that is granted to the at least one first device for management.

The sender 02 is specifically configured to: send the encrypted authorization information to a first device a in the at least one first device, where the encrypted authorization information is sent to the eUICC by the first device a; or, send the encrypted authorization information to a first device a in the at least one first device, where the encrypted authorization information is sent to a second device by the first device a, and is then sent to the eUICC by the second device.

The apparatus is configured to execute the foregoing method embodiment, implementation principles and technical effects thereof are similar, and details are not described herein again.

Figure 12:
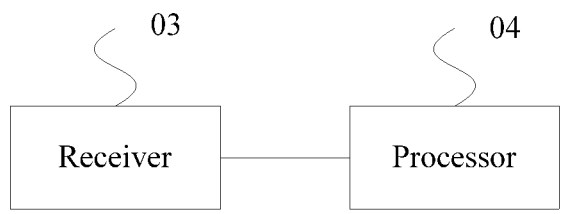
FIG. 12 is a schematic structural diagram of Embodiment 4 of an apparatus for authorizing management for an embedded universal integrated circuit card according to the present disclosure.

FIG. 12 is a schematic structural diagram of Embodiment 4 of an apparatus for authorizing management for an embedded universal integrated circuit card according to the present disclosure, and the apparatus may be integrated in an eUICC. As shown in FIG. 12, the apparatus includes a receiver 03 and a processor 04.

The receiver 03 is configured to receive encrypted authorization information sent by an eUICC manager or one of at least one first device.

The processor 04 is configured to: decrypt the encrypted authorization information to obtain authorization information; and when the authorization information includes an identifier of the at least one first device, update, according to the authorization information, an identifier of a first device corresponding to each profile management function in an eUICC; or when the authorization information includes at least one authorization credential, update, according to the authorization information, an authorization credential corresponding to each profile management function in an eUICC.

Further, when the authorization information includes the identifier of the at least one first device, the authorization information further includes a granted profile management function corresponding to each first device in the at least one first device.

The authorization information may further include a switching identifier, and the switching identifier is used to instruct to grant, to a first device b in the at least one first device, all of profile management functions currently granted to a first device a in the at least one first device.

When the authorization information includes the at least one authorization credential, the authorization information further includes a granted profile management function corresponding to each authorization credential in the at least one authorization credential.

Further, the authorization information further includes an identifier of a profile that is in the eUICC and that is granted to the at least one first device for management.

The apparatus is configured to execute the foregoing method embodiment, implementation principles and technical effects thereof are similar, and details are not described herein again.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a USB flash drive, a removable hard disk, a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for authorizing management for an embedded universal integrated circuit card (eUICC) and implemented by an eUICC manager, the method comprising:
generating authorization information, wherein the authorization information comprises an authorization table, wherein the authorization table comprises a relational database, wherein the authorization table comprises granted profile management functions and indications of first devices corresponding to each of the granted profile management functions, wherein the granted profile management functions comprise a profile activation function, a profile deactivation function, and a profile deletion function, and wherein the indications of the first devices comprise at least one first device corresponding to each one of the granted profile management functions;
encrypting the authorization information using an eUICC management credential to create encrypted authorization information;
sending the encrypted authorization information to the eUICC; and
receiving an authorization complete response in response to the encrypted authorization information.

2. The method of claim 1, further comprising sending the authorization credentials to the first devices.

3. The method of claim 2, further comprising sending, to the first devices, the granted profile management functions.

4. The method of claim 1, wherein sending the encrypted authorization information to the eUICC comprises sending the encrypted authorization information to the first devices for the first devices to send the encrypted authorization information to the eUICC.

5. The method of claim 1, wherein sending the encrypted authorization information to the eUICC comprises sending the encrypted authorization information to the first devices for the first devices to send the encrypted authorization information to a second device and for the second device to send the encrypted authorization information to the eUICC.

6. The method of claim 1, further comprising further generating the authorization information in response to a request message from an initiator, wherein the request message requests the eUICC manager to grant the granted profile management functions.

7. The method of claim 1, wherein the eUICC management credential is a pre-stored symmetric key or a temporarily generated symmetric key.

8. The method of claim 1, wherein the granted profile management functions comprise a first granted profile management function and a second granted profile management function, wherein the indications of the first devices comprise a first identifier of a first device a and a second identifier of a first device b, wherein the first identifier corresponds to the first granted profile management function, and wherein the first identifier and the second identifier correspond to the second granted profile management function.

9. The method of claim 8, wherein the granted profile management functions further comprise a third granted profile management function, wherein the indications of the first devices further comprise a third identifier of a first device c, and wherein the first identifier, the second identifier, and the third identifier correspond to the third granted profile management function.

10. The method of claim 1, wherein the indications of the first devices comprise authorization credentials, and wherein the authorization credentials comprise a numerical identifier.

11. The method of claim 1, wherein a first column of the relational database comprises the granted profile management functions, and wherein a second column of the relational database comprises the indications of the first devices.

12. A method for authorizing management for an embedded universal integrated circuit card (eUICC) and implemented by the eUICC, the method comprising:
receiving encrypted authorization information from an eUICC manager or a first device;
decrypting the encrypted authorization information to obtain authorization information, wherein the authorization information comprises an authorization table, wherein the authorization table comprises a relational database, wherein the authorization table comprises granted profile management functions and indications of first devices corresponding to each of the granted profile management functions, wherein the granted profile management functions comprise a profile activation function, a profile deactivation function, and a profile deletion function, and wherein the indications of the first devices comprise at least one first device corresponding to each one of the granted profile management functions;
updating, in the eUICC and according to the authorization information, the indications;
generating an authorization complete response in response to the updating; and
sending the authorization complete response.

13. The method of claim 12, wherein the granted profile management functions comprise a first granted profile management function and a second granted profile management function, wherein the indications of the first devices comprise a first identifier of a first device a and a second identifier of a first device b, wherein the first identifier corresponds to the first granted profile management function, and wherein the first identifier and the second identifier correspond to the second granted profile management function.

14. The method of claim 13, wherein the granted profile management functions further comprise a third granted profile management function, wherein the indications of the first devices further comprise a third identifier of a first device c, and wherein the first identifier, the second identifier, and the third identifier correspond to the third granted profile management function.

15. The method of claim 12, further comprising further sending the authorization complete response to the eUICC manager.

16. The method of claim 12, further comprising further sending the authorization complete response to the first device.

17. The method of claim 12, further comprising storing the authorization table in a memory of the eUICC.

18. An apparatus for authorizing management for an embedded universal integrated circuit card (eUICC), the apparatus comprising:
a receiver configured to receive encrypted authorization information from an eUICC manager or a first device; and
a processor coupled to the receiver and configured to:
decrypt the encrypted authorization information to obtain authorization information, wherein the authorization information comprises an authorization table, wherein the authorization table comprises a relational database, wherein the authorization table comprises granted profile management functions and indications of first devices corresponding to each of the granted profile management functions, wherein the granted profile management functions comprise a profile activation function, a profile deactivation function, and a profile deletion function, and wherein the indications of the first devices comprise at least one first device corresponding to each one of the granted profile management functions;
update, in the eUICC and according to the authorization information, the indications when the authorization information comprises the indications;
update, in the eUICC and according to the authorization information, the indications of the first devices when the authorization information comprises the indications of the first devices; and
generate an authorization complete response in response to the updating.

19. The apparatus of claim 18, wherein the first device is a profile manager (PM) or a profile provisioner (PP).

20. The apparatus of claim 18, wherein the granted profile management functions comprise a first granted profile management function and a second granted profile management function, wherein the indications of the first devices comprise a first identifier of a first device a and a second identifier of a first device b, wherein the first identifier corresponds to the first granted profile management function, and wherein the first identifier and the second identifier correspond to the second granted profile management function.

21. The apparatus of claim 20, wherein the granted profile management functions further comprise a third granted profile management function, wherein the indications of the first identifiers further comprise a third identifier of a first device c, and wherein the first identifier, the second identifier, and the third identifier correspond to the third granted profile management function.

22. The apparatus of claim 18, further comprising a transmitter coupled to the processor and configured to send the authorization complete response to the eUICC manager.

23. The apparatus of claim 18, further comprising a transmitter coupled to the processor and configured to send the authorization complete response to the first device.

* * * * *

UNITED STATES PATENT AND TRADEMARK OFFICE
CERTIFICATE OF CORRECTION

PATENT NO. : 10,623,952 B2
APPLICATION NO. : 15/322242
DATED : April 14, 2020
INVENTOR(S) : Linyi Gao Page 1 of 1

It is certified that error appears in the above-identified patent and that said Letters Patent is hereby corrected as shown below:

On the Title Page

Page 2, 2nd Column, Other Publications, Line 11, 5th publication: "ETSI IC SCP REQ Meeting #44" should read "ETSI TC SCP REQ Meeting #44"

Signed and Sealed this
Second Day of June, 2020

Andrei Iancu
*Director of the United States Patent and Trademark Office*